US012343746B2

(12) United States Patent
Gohl

(10) Patent No.: US 12,343,746 B2
(45) Date of Patent: *Jul. 1, 2025

(54) CAVITY CLEANING AND COATING SYSTEM

(71) Applicant: Russell R. Gohl, Minot AFB, ND (US)

(72) Inventor: Russell R. Gohl, Minot AFB, ND (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/507,750

(22) Filed: Nov. 13, 2023

(65) Prior Publication Data

US 2024/0075491 A1 Mar. 7, 2024

Related U.S. Application Data

(63) Continuation of application No. 18/190,267, filed on Mar. 27, 2023, now Pat. No. 11,839,892, which is a continuation of application No. 17/671,811, filed on Feb. 15, 2022, now Pat. No. 11,618,049, which is a continuation of application No. 17/343,079, filed on Jun. 9, 2021, now Pat. No. 11,253,883.

(51) Int. Cl.

*B05B 13/04* (2006.01)
*B05B 12/14* (2006.01)
*B08B 9/093* (2006.01)

(52) U.S. Cl.

CPC .......... *B05B 13/0431* (2013.01); *B05B 12/14* (2013.01); *B08B 9/0936* (2013.01); *B08B 2240/00* (2013.01)

(58) Field of Classification Search

None

See application file for complete search history.

(56) References Cited

U.S. PATENT DOCUMENTS

| | | | |
|---|---|---|---|
| 1,437,008 | A | 11/1922 | Otterson |
| 1,561,744 | A | 11/1925 | Raymond |
| 2,010,540 | A | 8/1935 | Evans |
| 2,767,415 | A | 10/1956 | Morris |
| 3,409,031 | A | 11/1968 | Benbow |
| 3,658,589 | A | 4/1972 | Shaddock |
| 3,754,361 | A | 8/1973 | Branham |
| 3,774,630 | A | 11/1973 | Prange |
| 3,791,447 | A | 2/1974 | Smith |
| 3,842,461 | A | 10/1974 | Wurster |
| 3,958,594 | A | 5/1976 | Masters |
| 4,066,093 | A | 1/1978 | Egerstrom |
| 4,103,841 | A | 8/1978 | Flynn |

(Continued)

*Primary Examiner* — Cristi J Tate-Sims

(74) *Attorney, Agent, or Firm* — Neustel Law Offices

(57) ABSTRACT

A cavity cleaning and coating system for safely and efficiently cleaning and coating the interior of a cavity without requiring entry of any workers. The cavity cleaning and coating system generally includes a mount which is coupled with a movable arm of a vehicle. The mount includes an inner plate, which is coupled to the arm, and an outer plate. A shaft is coupled to the outer plate. The mount is adjustable independently of the arm of the vehicle, including outwardly, inwardly, and rotatably. A spray head is connected to the shaft. The spray head is rotatable and includes a dispenser for dispensing fluids. The vehicle is positioned near a cavity to be treated. The mount is adjusted for optimal positioning of the spray head. The spray head is lowered into the cavity to dispense a cleaning fluid and, after the cleaning fluid has dried, a coating fluid.

20 Claims, 15 Drawing Sheets

(56) References Cited

U.S. PATENT DOCUMENTS

| | | | |
|---|---|---|---|
| 4,135,340 A | 1/1979 | Cox | |
| 4,199,837 A | 4/1980 | Fisco, Jr. | |
| 4,234,980 A | 11/1980 | DiVito | |
| 4,290,495 A | 9/1981 | Elliston | |
| 4,322,868 A | 4/1982 | Wurster | |
| 4,324,077 A | 4/1982 | Woolslayer | |
| 4,367,145 A | 1/1983 | Simpson | |
| 4,371,041 A | 2/1983 | Becker | |
| 4,454,999 A | 6/1984 | Woodruff | |
| 4,469,306 A | 9/1984 | Wimer | |
| 4,540,017 A | 9/1985 | Prange | |
| 4,543,183 A | 9/1985 | Petretti | |
| 4,578,198 A | 3/1986 | Schmidt | |
| 4,669,145 A | 6/1987 | Kehr | |
| 4,690,006 A | 9/1987 | Urata | |
| 4,800,616 A | 1/1989 | Wade | |
| 4,805,653 A * | 2/1989 | Krajicek | B08B 9/0433 239/165 |
| 4,816,167 A | 3/1989 | Vanderslice | |
| 4,831,795 A | 5/1989 | Sorokan | |
| 4,838,302 A | 6/1989 | Prange | |
| 4,854,058 A | 8/1989 | Sloan | |
| 4,896,686 A | 1/1990 | Schmidt, Jr. | |
| 4,922,571 A | 5/1990 | Driear | |
| 4,967,841 A | 11/1990 | Murray | |
| 4,993,443 A | 2/1991 | Buchert | |
| 5,002,438 A | 3/1991 | Strong | |
| 5,068,940 A | 12/1991 | Sheppard | |
| 5,092,265 A | 3/1992 | Hughes | |
| 5,106,440 A | 4/1992 | Tangeman | |
| 5,129,957 A | 7/1992 | Sheppard | |
| 5,139,751 A | 8/1992 | Mansfield | |
| 5,086,842 A | 11/1992 | Cholet | |
| 5,165,434 A | 11/1992 | Tobiason | |
| 5,246,181 A | 9/1993 | Straub | |
| 5,248,005 A | 9/1993 | Mochizuki | |
| 5,265,981 A | 11/1993 | McNeil | |
| RE34,585 E | 4/1994 | Schmidt, Jr. | |
| 5,312,551 A | 5/1994 | Perron | |
| 5,336,333 A | 8/1994 | Shepperd | |
| 5,341,539 A | 8/1994 | Sheppard | |
| 5,385,752 A | 1/1995 | Steele | |
| 5,428,862 A | 7/1995 | Sailer | |
| 5,452,853 A | 9/1995 | Shook | |
| 5,522,646 A | 6/1996 | Friedman | |
| 5,598,866 A | 2/1997 | Hanson | |
| 5,636,648 A | 6/1997 | O'Brien | |
| 5,762,083 A | 6/1998 | Bate | |
| 5,794,723 A | 8/1998 | Caneer, Jr. | |
| 5,948,171 A | 9/1999 | Grothaus | |
| 6,059,214 A | 5/2000 | Rashidi | |
| 6,170,577 B1 | 1/2001 | Noles, Jr. | |
| 6,347,761 B1 | 2/2002 | Larson | |
| 6,437,285 B1 | 8/2002 | Thomas | |
| 6,438,792 B1 | 8/2002 | Cappellotto | |
| 6,474,349 B1 | 11/2002 | Laker | |
| 6,474,926 B2 | 11/2002 | Weiss | |
| 6,523,554 B1 | 2/2003 | Bryant, Sr. | |
| 6,699,324 B1 | 3/2004 | Berdin | |
| 6,764,604 B1 | 7/2004 | Nezat, II | |
| 6,790,368 B1 | 9/2004 | Vachon | |
| 6,820,653 B1 | 11/2004 | Schempf | |
| 7,182,163 B1 | 2/2007 | Gipson | |
| 7,308,953 B2 | 12/2007 | Barnes | |
| 7,670,086 B2 | 3/2010 | Kiest, Jr. | |
| 7,979,944 B1 | 7/2011 | Martin, III | |
| 8,250,816 B2 | 8/2012 | Donnally | |
| 8,328,290 B2 | 12/2012 | Malatesta | |
| 8,468,753 B2 | 6/2013 | Donnally | |
| 8,500,429 B2 | 8/2013 | Kiest, Jr. | |
| 8,739,354 B2 | 6/2014 | Buckner | |
| 8,887,800 B2 | 11/2014 | Havinga | |
| 9,862,437 B2 | 1/2018 | Smith | |
| 10,024,459 B1 | 7/2018 | Friedlein | |
| 10,125,577 B1 | 11/2018 | Carter | |
| 10,132,426 B2 | 11/2018 | Baker | |
| 10,450,771 B2 | 10/2019 | Buckner | |
| 10,799,899 B2 | 10/2020 | Schuetz | |
| 10,875,040 B2 | 12/2020 | Rancourt | |
| D910,252 S | 2/2021 | Schuetz | |
| 11,136,213 B2 | 10/2021 | Russell | |
| 11,253,883 B1 | 2/2022 | Gohl | |
| 11,351,903 B1 | 6/2022 | Williamson | |
| 2002/0036012 A1 | 3/2002 | Spear | |
| 2002/0100898 A1* | 8/2002 | Knoerzer | H02G 1/08 254/134.3 R |
| 2002/0104900 A1 | 8/2002 | Borcea | |
| 2003/0070694 A1 | 4/2003 | McCleary | |
| 2004/0089323 A1 | 5/2004 | Hatley | |
| 2004/0211598 A1 | 10/2004 | Palidis | |
| 2004/0240973 A1 | 12/2004 | Andrews | |
| 2005/0161221 A1 | 7/2005 | Diamon | |
| 2005/0217855 A1 | 10/2005 | Stave | |
| 2005/0236042 A1 | 10/2005 | Hansen | |
| 2005/0252531 A1 | 11/2005 | Landaas | |
| 2006/0027373 A1 | 2/2006 | Carriere | |
| 2006/0179603 A1 | 8/2006 | Polston | |
| 2006/0213653 A1 | 9/2006 | Cunningham | |
| 2007/0163938 A1 | 7/2007 | Davis | |
| 2009/0200856 A1 | 8/2009 | Chehade | |
| 2009/0205675 A1 | 8/2009 | Sarkar | |
| 2009/0283324 A1 | 11/2009 | Konduc | |
| 2009/0288834 A1 | 11/2009 | Erkol | |
| 2010/0095559 A1 | 4/2010 | Buckner | |
| 2010/0186945 A1 | 7/2010 | Hagen | |
| 2011/0114386 A1 | 5/2011 | Souchek | |
| 2012/0097192 A1 | 4/2012 | Crawford | |
| 2012/0247570 A1 | 10/2012 | Zink | |
| 2013/0284422 A1 | 10/2013 | Irvine | |
| 2014/0299158 A1 | 10/2014 | Cooper | |
| 2014/0338926 A1 | 11/2014 | Baugh | |
| 2015/0165497 A1 | 6/2015 | Bozso | |
| 2015/0308233 A1 | 10/2015 | Parker | |
| 2015/0360259 A1 | 12/2015 | Polston | |
| 2015/0360265 A1 | 12/2015 | Thomas | |
| 2016/0001832 A1 | 1/2016 | Beiler | |
| 2016/0251940 A1 | 9/2016 | De Witt | |
| 2016/0256903 A1 | 9/2016 | Motzo | |
| 2016/0288176 A1 | 10/2016 | Englent | |
| 2017/0197536 A1 | 7/2017 | Mayer | |
| 2017/0203338 A1 | 7/2017 | Harr | |
| 2017/0203342 A1 | 7/2017 | Hunter | |
| 2017/0234458 A1 | 8/2017 | Baker | |
| 2017/0307312 A1 | 10/2017 | Wall | |
| 2018/0099837 A1 | 4/2018 | Bambauer | |
| 2018/0230689 A1 | 8/2018 | Schaafsma | |
| 2018/0009011 A1 | 11/2018 | Polston | |
| 2018/0328146 A1 | 11/2018 | Kartha | |
| 2019/0060965 A1 | 2/2019 | MacNeil | |
| 2019/0086017 A1 | 3/2019 | Illingworth | |
| 2019/0093382 A1 | 3/2019 | Sauber | |
| 2019/0120002 A1 | 4/2019 | Zhang | |
| 2019/0169961 A1 | 6/2019 | Dennis | |
| 2019/0194929 A1 | 6/2019 | Schneider | |
| 2019/0271143 A1 | 9/2019 | Iwasaki-Higbee | |
| 2019/0301660 A1 | 10/2019 | Hale | |
| 2019/0351801 A1 | 11/2019 | Rousselle | |
| 2019/0360289 A1 | 11/2019 | Jones | |
| 2019/0375326 A1 | 12/2019 | Merth | |
| 2020/0078838 A1 | 3/2020 | Hengen | |
| 2020/0122625 A1 | 4/2020 | Sutherland | |
| 2020/0230668 A1 | 7/2020 | Baek | |
| 2020/0290098 A1 | 9/2020 | Vazzana | |
| 2020/0344945 A1 | 11/2020 | Bambauer | |
| 2020/0398320 A1 | 12/2020 | Cole | |
| 2021/0001939 A1 | 1/2021 | Beiler | |
| 2021/0172291 A1 | 6/2021 | Al-Qasim | |
| 2021/0332671 A1 | 10/2021 | Howitt | |
| 2022/0080475 A1 | 3/2022 | Camell | |
| 2023/0234089 A1 | 7/2023 | Gohl | |

* cited by examiner

CAVITY CLEANING AND COATING SYSTEM

CROSS REFERENCE TO RELATED APPLICATIONS

The present application is a continuation of pending U.S. application Ser. No. 18/190,267, filed on Mar. 27, 2023, which is a continuation of U.S. application Ser. No. 17/671,811 filed on Feb. 15, 2022 which issued as U.S. Pat. No. 11,618,049 on Apr. 4, 2023, which is a continuation of U.S. application Ser. No. 17/343,079 filed on Jun. 9, 2021 now issued as U.S. Pat. No. 11,253,883. Each of the aforementioned patent applications is herein incorporated by reference in their entirety.

STATEMENT REGARDING FEDERALLY SPONSORED RESEARCH OR DEVELOPMENT

Not applicable to this application.

BACKGROUND

Field

Example embodiments in general relate to a cavity cleaning and coating system for safely and efficiently cleaning and coating the interior of a cavity without requiring entry of any workers.

Related Art

Any discussion of the related art throughout the specification should in no way be considered as an admission that such related art is widely known or forms part of common general knowledge in the field.

The interior of cavities such as manholes require routine maintenance. Such cavities, which are typically vertical or substantially vertical openings extending into the ground surface, can develop build-ups of grime or contaminants over time. Thus, it is important to routinely clean such cavities to remove such grime or contaminants. It also important to coat the interior of such cavities to reduce the future build-up of such grime or contaminants. Such coatings may include various types of paints or other films, coatings, and the like which are applied to the interior of the cavity after cleaning.

In the past, maintenance of cavities such as manholes has required entry of a worker down into the cavity. This can present a number of risks to the worker, as the worker will be required to lower herself into an enclosed space and may be exposed to sewer gases or other biological contaminants. It would be far preferable to efficiently clean and coat the interior of such cavities without requiring such workers to enter a potentially hazardous, enclosed space.

SUMMARY

An example embodiment is directed to a cavity cleaning and coating system. The cavity cleaning and coating system includes a mount which is coupled with a movable arm of a vehicle. The mount includes an inner plate, which is coupled to the arm, and an outer plate. A shaft is coupled to the outer plate. The mount is adjustable independently of the arm of the vehicle, including outwardly, inwardly, and rotatably. A spray head is connected to the distal end of the shaft. The spray head is rotatable and includes a dispenser for dispensing cleaning and coating fluids. The vehicle is positioned near a cavity to be treated. The mount is adjusted for optimal positioning of the spray head. The spray head is lowered into the cavity to dispense the cleaning fluid and, after the cleaning fluid has dried, the coating fluid.

There has thus been outlined, rather broadly, some of the embodiments of the cavity cleaning and coating system in order that the detailed description thereof may be better understood, and in order that the present contribution to the art may be better appreciated. There are additional embodiments of the cavity cleaning and coating system that will be described hereinafter and that will form the subject matter of the claims appended hereto. In this respect, before explaining at least one embodiment of the cavity cleaning and coating system in detail, it is to be understood that the cavity cleaning and coating system is not limited in its application to the details of construction or to the arrangements of the components set forth in the following description or illustrated in the drawings. The cavity cleaning and coating system is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

A. Overview

Figure 1:
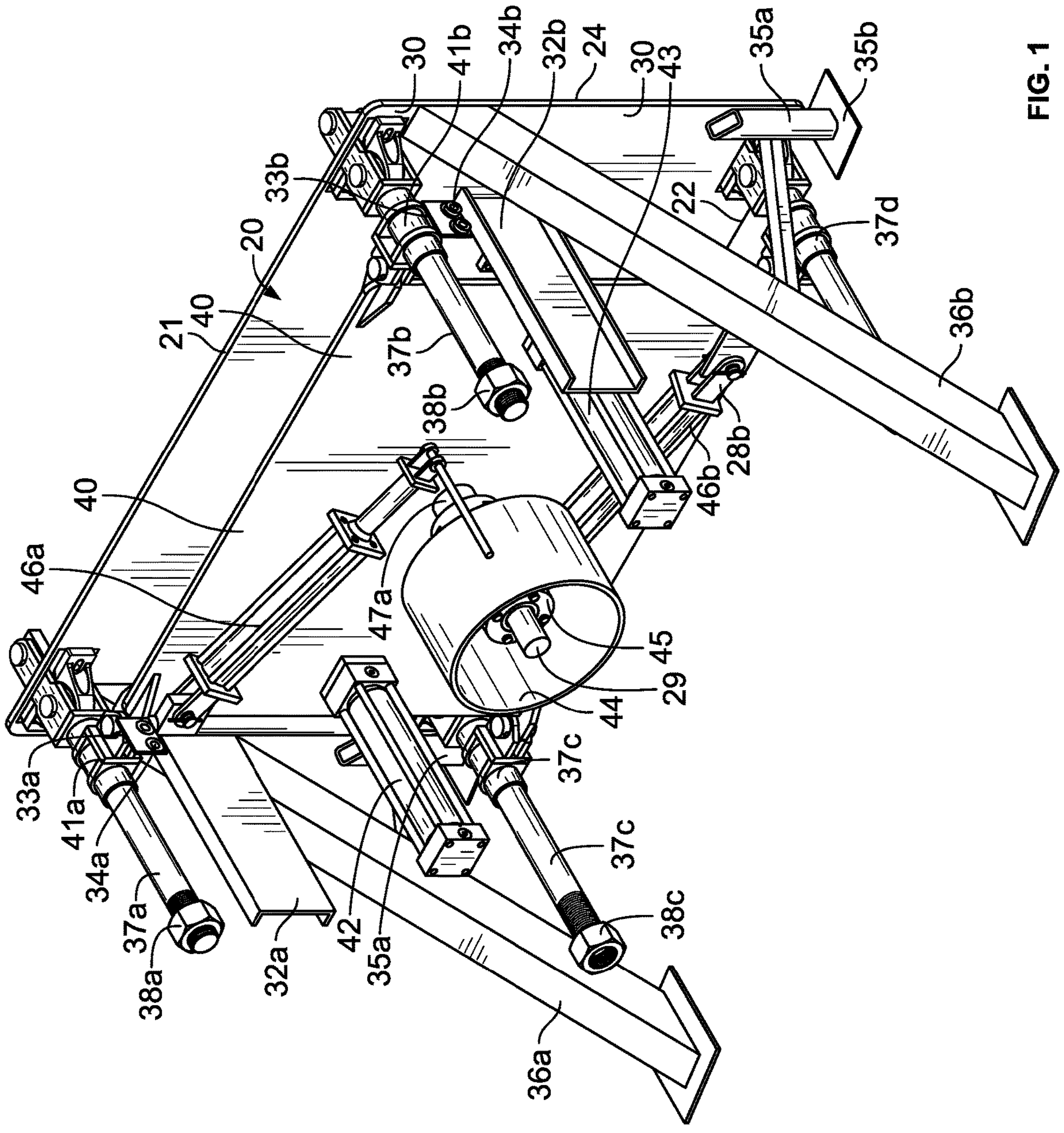
FIG. 1 is a perspective view of a mount of a cavity cleaning and coating system in accordance with an example embodiment.

An example cavity cleaning and coating system generally comprises a mount 20 adapted to be connected to an arm 13 of a vehicle 12. The attitude of the mount 20 is adapted to be adjustable independently of the arm 13 of the vehicle 12. A shaft 50 is coupled to the mount 20, with the shaft 50 being adapted to be raised or lowered with respect to the mount 20. A spray head 60 is connected to a distal end of the shaft 50. The spray head 60 is adapted to be lowered into a cavity 18 by the shaft 50 or raised out of the cavity 18 by the shaft 50. The spray head 60 is adapted to rotate within the cavity 18. A dispenser 71 is connected to the spray head 60. The dispenser 71 is adapted to dispense a cleaning fluid or a coating fluid within the cavity 18.

The mount 20 is movable inwardly towards the shaft 50 or outwardly away from the shaft 50. The mount 20 is rotatable with respect to the shaft 50. The mount 20 comprises an inner plate 30 and an outer plate 40, with the shaft 50 being coupled to the outer plate 40 of the mount 20. The outer plate 40 is adjustable inwardly towards the inner plate 30 or outwardly away from the inner plate 30.

At least one actuator 42, 43 is connected between the outer plate 40 and the inner plate 30 for adjusting the outer plate 40 towards or away from the inner plate 30. The shaft 50 is rotatable with respect to the mount 20. An actuator **46*a*, 46*b* is connected to the inner plate 30 for rotating the shaft 50 with respect to the mount. A linear actuator is connected to the shaft 50 for raising or lowering the shaft 50 with respect to the mount 20. The linear actuator may comprise a rack 53 and pinion 54**.

A method of cleaning and coating a cavity 18 using the cavity cleaning and coating system comprises the steps of positioning the mount 20 near the cavity; adjusting the attitude of the mount 20 to optimally position the spray head 60 over the cavity 18; lowering the shaft 50 so as to lower the spray head 60 into the cavity 18; rotating the spray head 60 within the cavity 18; dispensing a cleaning fluid from the dispenser 71 to clean the cavity; and dispensing a coating fluid from the dispenser to coat the cavity 18 after the cleaning fluid has dried. The cleaning fluid may be comprised of water and the coating fluid may be comprised of an epoxy.

An additional embodiment of a cavity cleaning and coating system may comprise a vehicle 12 including at least one arm 13 movably connected to the vehicle 12. A mount 20 is connected to the at least one arm 13 of the vehicle 12. The mount 20 comprises an inner plate 30 and an outer plate 40, with the inner plate 30 of the mount 20 being connected to the at least one arm 13 of the vehicle 12. The inner plate 30 is adjustable inwardly or outwardly with respect to the outer plate 40. A shaft 50 is coupled to the outer plate 40 of the mount 20, with the shaft 50 being rotatable with respect to the mount 20.

A linear actuator is connected to the shaft 50 so as to raise or lower the shaft 50 with respect to the mount 20. A spray head 60 is connected to a distal end of the shaft 50. The spray head 60 is adapted to be lowered into a cavity 18 by the shaft 50 or raised out of the cavity 18 by the shaft 50. The spray head 60 is adapted to rotate within the cavity 18. A dispenser 71 is connected to the spray head 60, with the dispenser 71 being adapted to dispense a cleaning fluid or a coating fluid within the cavity 18. The shaft 50 is movably connected to a shaft housing 51. In such an embodiment, the shaft housing 51 is connected to the outer plate 40 of the mount 20. The cleaning fluid may be comprised of water and the coating fluid may be comprised of paint. A controller 58 may be provided for controlling movement of the inner plate 30, the outer plate 40, the shaft 50, and the spray head 60.

B. Vehicle

As best shown in FIGS. 6, 7, 15, and 16, the cavity cleaning and coating system will generally include a vehicle 12 which is used to transport the shaft 50 and spray head 60 between various locations, such as between cavities 18 to be cleaned and coated. Various types of vehicles 12 may be utilized, including but not limited to a skid steer loader as is shown in the figures. By way of example and without limitation, exemplary vehicles 12 may include loaders such as skid steers, tractors, all-terrain vehicles, trucks, excavators, cars, and the like.

As best shown in FIGS. 6, 7, 11, 15, and 16, the vehicle 12 may include an arm 13 which is movably connected to the vehicle 12. The arm 13 is generally controlled from within the cab of the vehicle 12, though external or remote controls may be utilized in some embodiments. In other embodiments, the arm 13 of the vehicle 12 may be directly controlled by the same controller 58 that controls movement of the mount 20 and shaft 50 as discussed herein.

Figure 6:
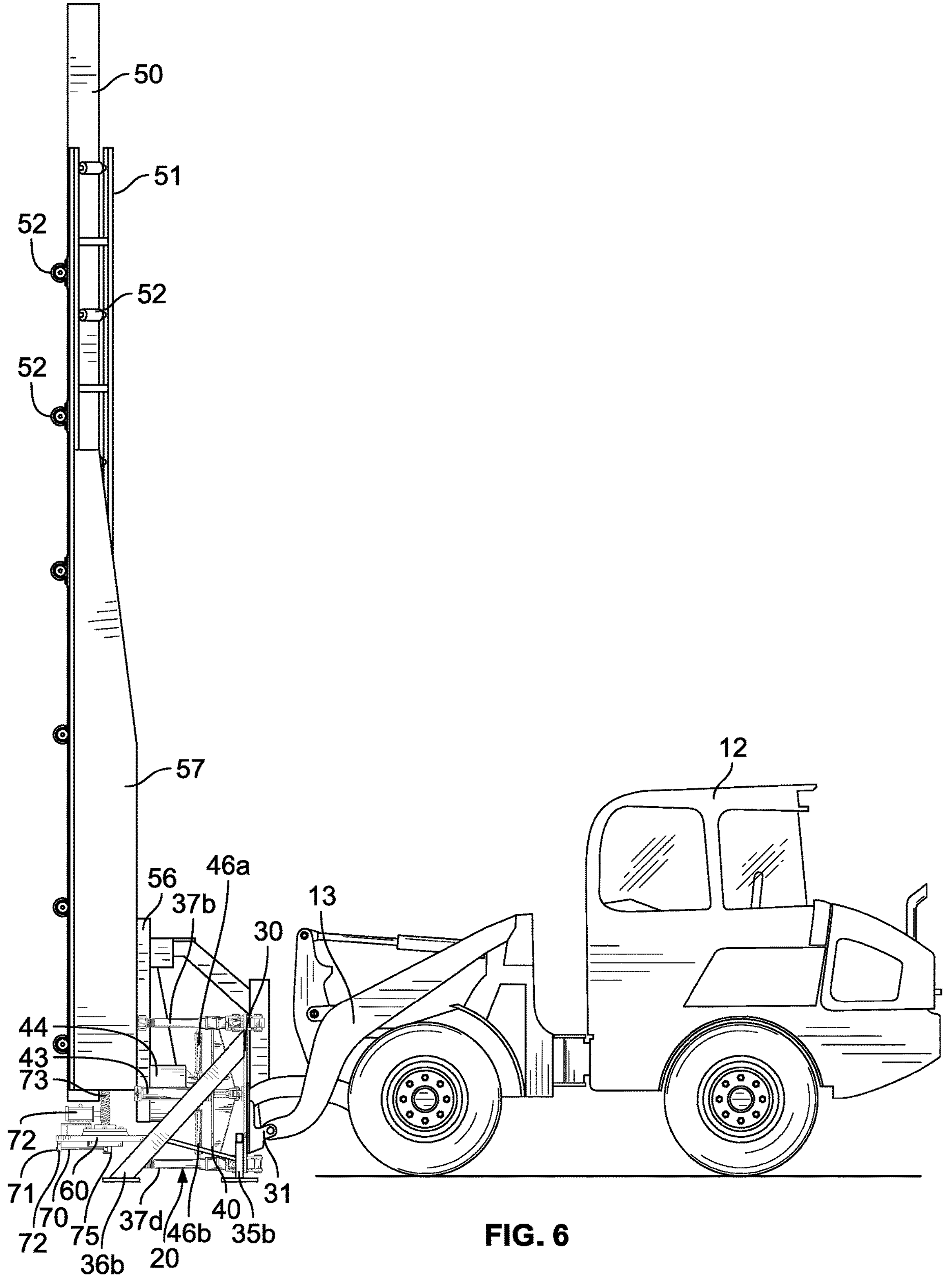
FIG. 6 is a side view of a cavity cleaning and coating system with the shaft in a horizontal position in accordance with an example embodiment.
Figure 7:
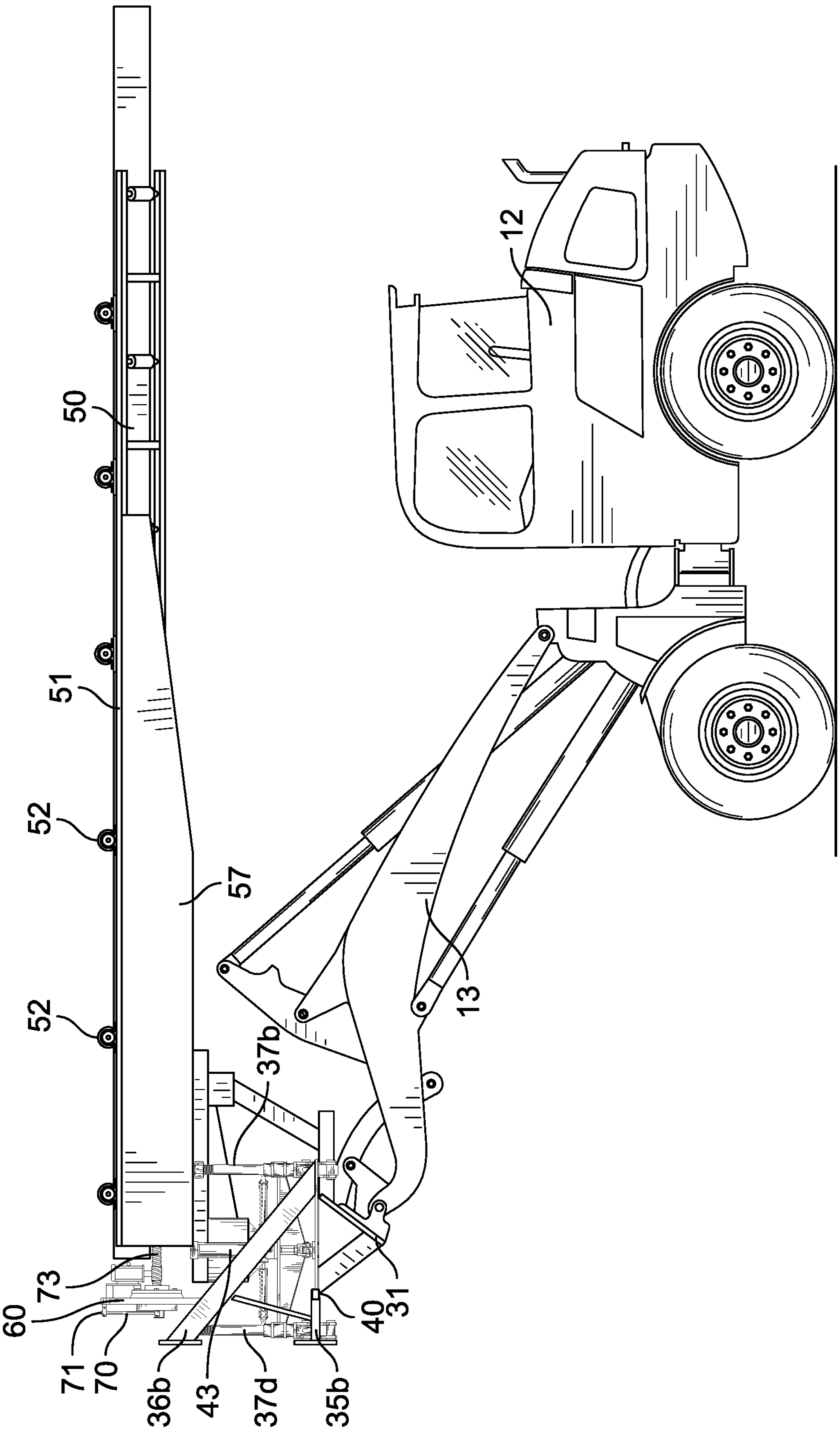
FIG. 7 is a side view of a cavity cleaning and coating system with the shaft in a vertical position in accordance with an example embodiment.

Continuing to reference FIGS. 6, 7, 11, 15, and 16, it can be seen that the arm 13 of the vehicle 12 may be raised or lowered, generally following an arced path between a raised position and a lowered position. FIG. 7 illustrates the arm 13 in its raised position, with the shaft 50 being positioned horizontally above the vehicle 12. Such a position is ideal for transporting or storing the vehicle 12 so as to significantly reduce the requirement of overhead clearance to accommodate the height of the shaft 50. FIG. 6 illustrates the arm 13 in its lowered position, with the shaft 50 being positioned vertically and ready for use. While the figures illustrate that the arm 13 is positioned on the rear side of the vehicle 12, it should be appreciated that the arm 13 may alternatively be positioned on the front side of the vehicle 12 in some embodiments.

While the figures only illustrate the arm 13 as being adjustable between a raised and lowered position, additional directions of movement, such as in/out, may be supported by the arm 13. However, in the embodiment shown in the figures, the independent adjustability of the mount 20 and shaft 50 obviates the need for additional directions of movement of the arm 13. In some embodiments, the vehicle 12 may include multiple arms 13.

Generally, the arm 13 of the vehicle 12 will be coupled to the mount 20 by attaching directly to a loader coupling 31 on the mount 20. The loader coupling 31 may comprise various types of brackets or the like to which the arm 13 may be coupled to connect the mount 20 to the arm 13 of the vehicle 12. The loader coupling 31 may be comprised of a quick-connect and quick-disconnect type to allow easy connection/disconnection of the coupling 31 to/from the arm 13 of the vehicle 12. The loader coupling 13 may also include a hinge to allow the mount 20 to pivot with respect to the arm 13 of the vehicle 12.

C. Adjustable Mount

As best shown in FIGS. 1-5, 11, and 14, the cavity cleaning and coating system generally includes a mount 20 which interconnects the shaft 50 with the arm 13 of the vehicle 12. The mount 20 is generally adjustable in a number of directions and manners so as to allow the shaft 50 to be properly positioned for use above the cavity 18. In the embodiment shown in the figures, the mount 20 is adapted to be independently adjustable with respect to the arm 13 (i.e., the mount 20 may be adjusted without movement of the arm 13). Thus, the attitude of the mount 20 (e.g., pitch, yaw, etc.) may be adjusted without movement of the arm 13 of the vehicle 12.

Figure 2:
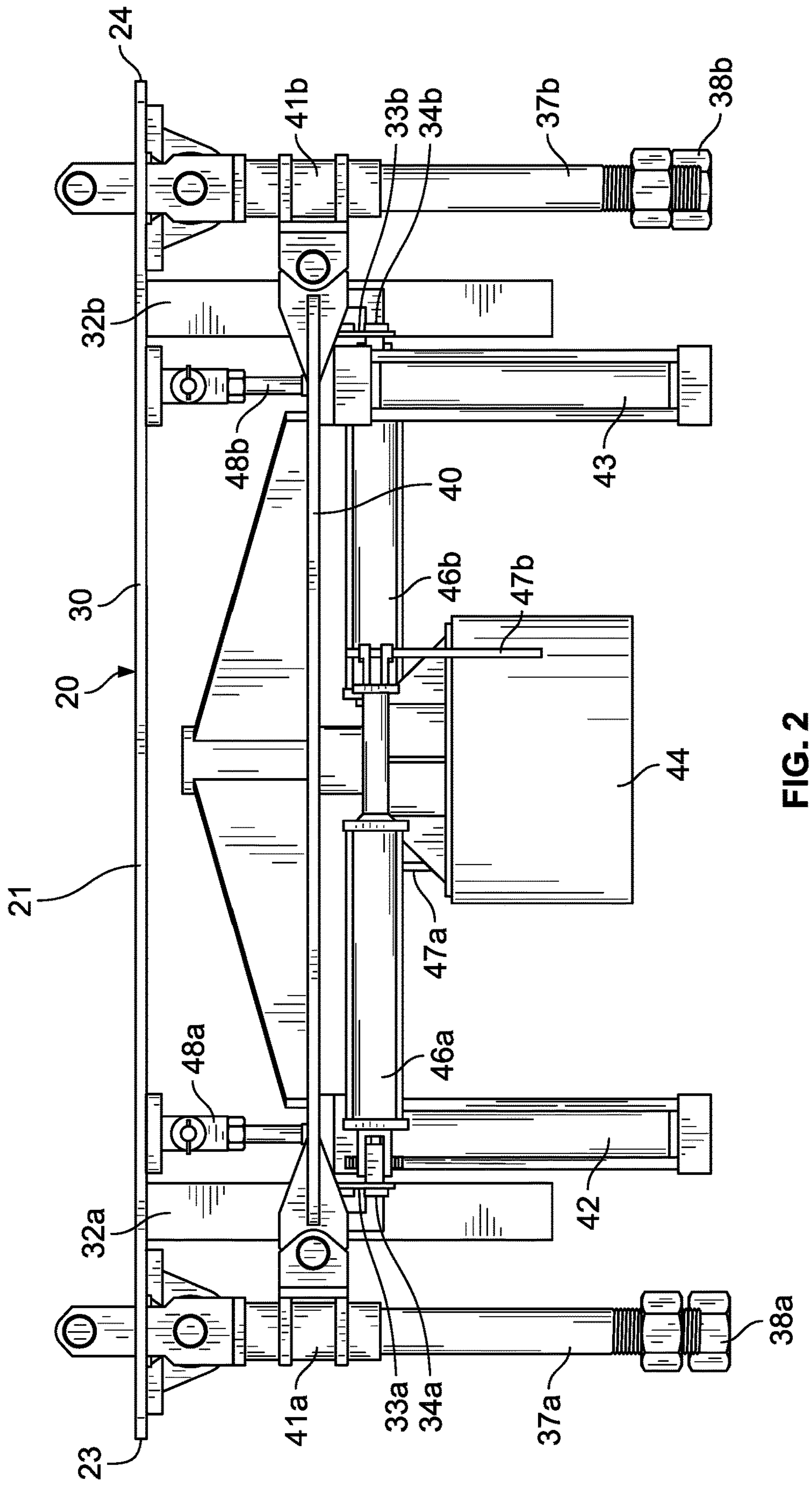
FIG. 2 is a top view of a mount of a cavity cleaning and coating system in accordance with an example embodiment.
Figure 3:
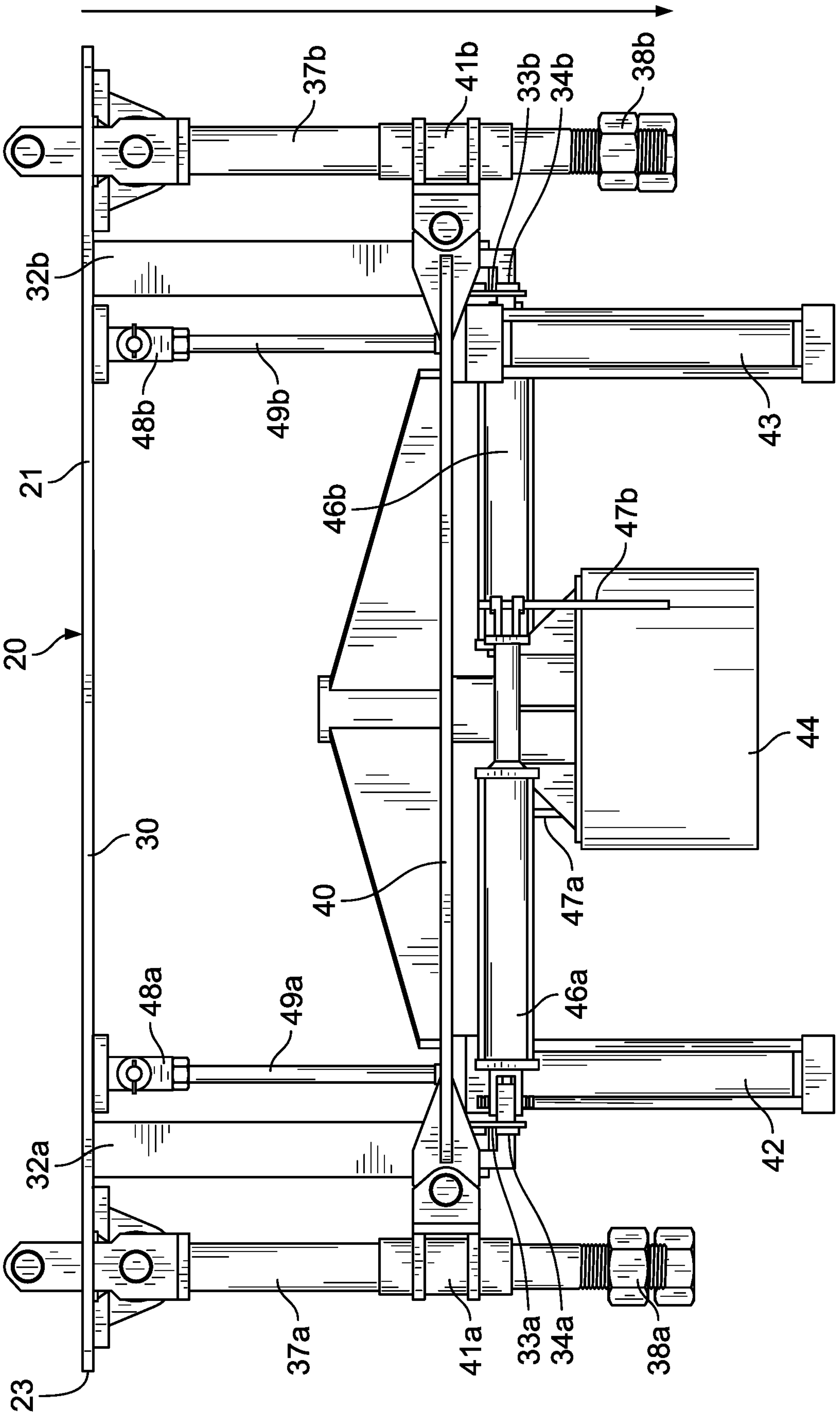
FIG. 3 is a top view of a mount in an extended position of a cavity cleaning and coating system in accordance with an example embodiment.

As best shown in FIGS. 1-5, the mount 20 may comprise an upper end 21, a lower end 22, a first side 23, and a second side 24. The mount 20 generally includes both an inner plate 30, which is connected to the arm 13 of the vehicle 12 by the loader coupling 31, and an outer plate 40, which is connected to the shaft housing 51. Generally, the outer plate 40 is adapted to be adjusted with respect to the inner plate 30 such as shown in FIGS. 2 and 3, such that the outer plate 40 may be pushed outwardly away from the inner plate 30 and pulled inwardly towards the inner plate 30.

As best shown in FIGS. 1, 6, 7, 11, 12, 15, and 16, the mount 20 may comprise a plurality of legs 35*a*, 35*b*, 36*a*, 36*b* which are adapted to engage and rest upon a ground surface underneath the mount 20 when the mount 20 is lowered onto the ground surface. For example, when the mount 20 is positioned adjacent to a cavity 18 to be cleaned, the legs 35*a*, 35*b*, 36*a*, 36*b* will generally be positioned on either side of the cavity 18. More specifically, a pair of first side legs 35*a*, 35*b* will be positioned on a first side of the cavity 18 and a pair of second side legs 36*a*, 36*b* will be positioned on a second side of the cavity 18.

As best shown in FIG. 1, the plurality of legs 35*a*, 35*b*, 36*a*, 36*b* may comprise a pair of first side legs 35*a*, 35*b* and a pair of second side legs 36*a*, 36*b*. The pair of first side legs 35*a*, 35*b* are positioned at or near a first side 23 of the mount 20 and the pair of second side legs 36*a*, 36*b* are positioned at or near a second side 24 of the mount 20. It should be appreciated that the shape, size, positioning, orientation, and number of legs 35*a*, 35*b*, 36*a*, 36*b* may vary in different embodiments, and thus should not be construed as limited by the exemplary embodiment shown in the figures.

In the exemplary embodiment best shown in FIG. 1, it can be seen that the first side legs 35*a*, 35*b* may each comprise a vertical elongated member such as a tube, rod, pole, or the like which is connected to the mount 20. More specifically, the first side legs 35*a*, 35*b* are shown as being connected to the inner plate 30 of the mount 20. The first side legs 35*a*, 35*b* may each include a footing, such as a plate, which is adapted to be positioned against a ground surface.

Continuing to reference FIG. 1, it can be seen that the second side legs 36*a*, 36*b* may each comprise a diagonal elongated member such as a tube, rod, pole, or the like which is connected to the mount 20. More specifically, the second side legs 36*a*, 36*b* are shown as being connected to the inner plate 30 of the mount 20. The second side legs 36*a*, 36*b* may each include a footing, such as a plate, which is adapted to be positioned against a ground surface.

As shown in the figures, the first side legs 35*a*, 35*b* may each be attached to or extend from the inner plate 30 of the mount 20. The first side leg 35*a* may be attached to the inner plate 30 at or near the lower end 22 and first side 23 of the mount 20. The first side leg 35*b* may be attached to the inner plate 30 at or near the lower end 22 and second side 24 of the mount 20. The second side leg 36*a* may be attached to the inner plate 30 at or near the upper end 21 and first side 23 of the mount 20. The second side leg 36*b* may be attached to the inner plate 30 at or near the upper end 21 and second side 24 of the mount 20.

Figure 15:
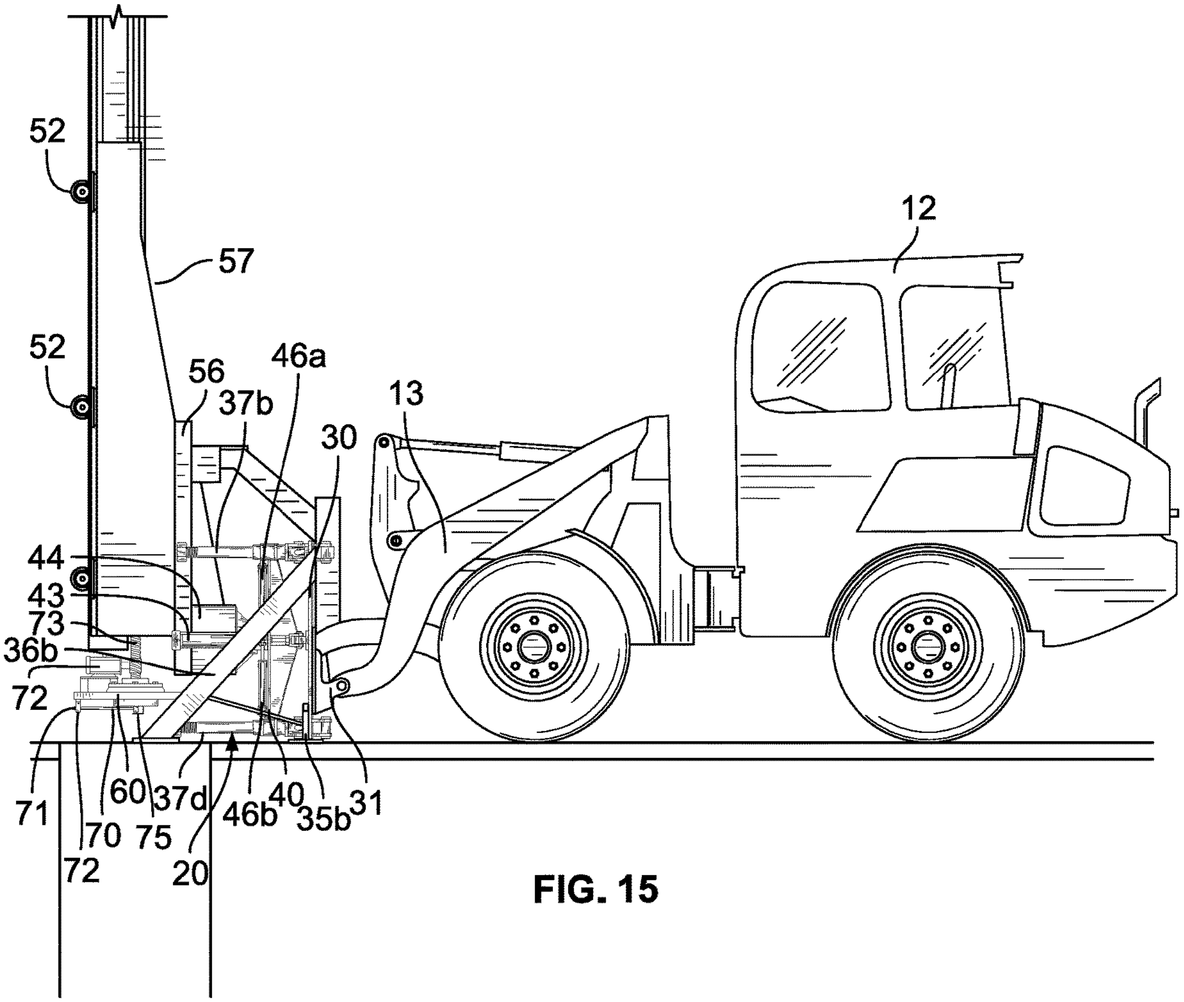
FIG. 15 is a side view of a cavity cleaning and coating system with the spray head positioned above a cavity in accordance with an example embodiment.
Figure 16:
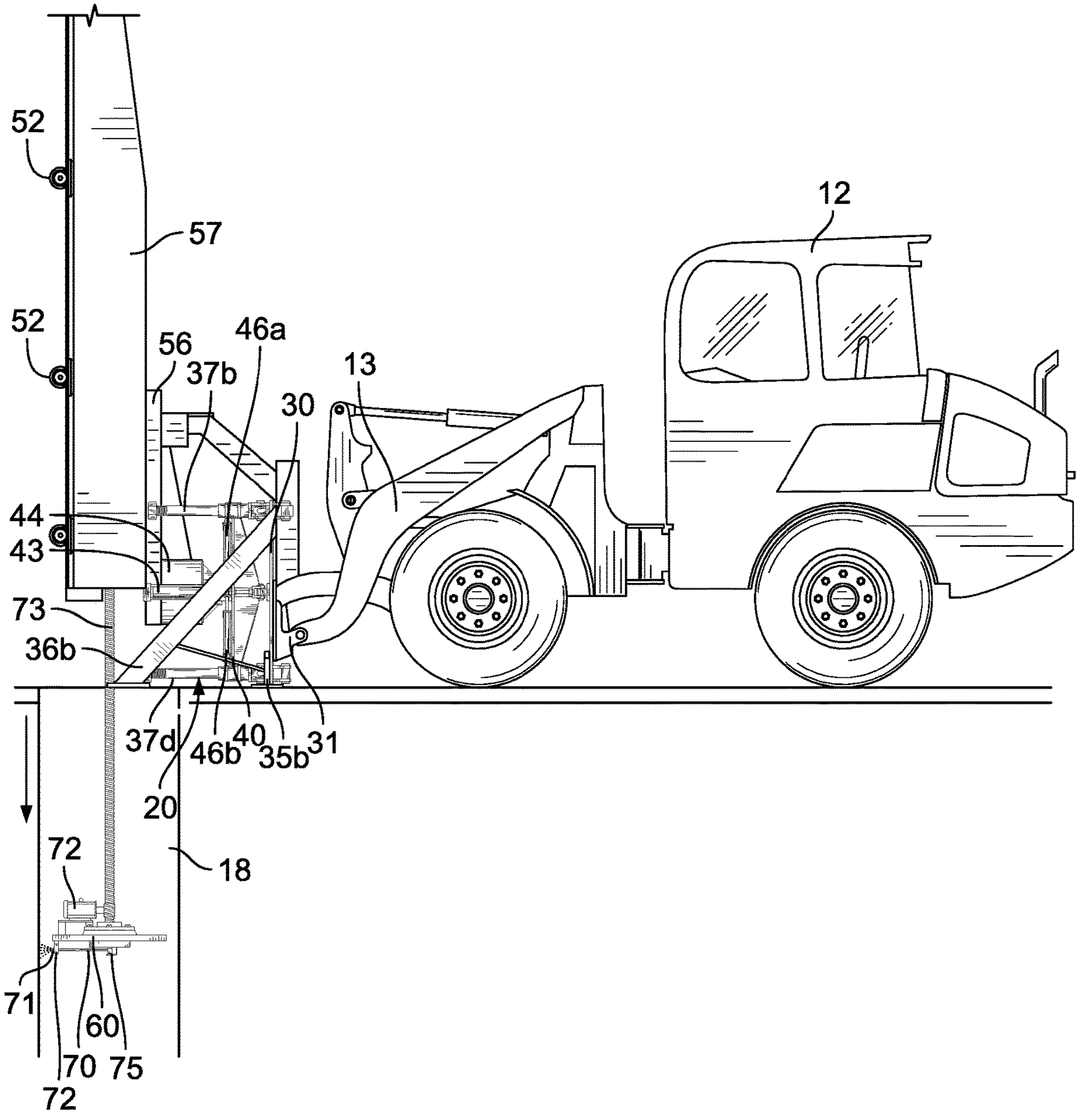
FIG. 16 is a side view of a cavity cleaning and coating system with the spray head lowered into a cavity in accordance with an example embodiment.

Continuing to reference FIG. 1, it can be seen that the first pair of side legs 35*a*, 35*b* extend vertically and that the second pair of side legs 36*a*, 36*b* extend horizontally. Various other orientations may be utilized. It can be seen that a cross bar may interconnect each of the first pair of side legs 35*a*, 35*b* with each of the second side legs 36*a*, 36*b*. However, such a cross bar may be omitted in some embodiments. Both pairs of side legs 35*a*, 35*b*, 36*a*, 36*b* are positioned so as to extend on either side of a cavity 18 such as shown in FIGS. 15 and 16.

As best shown in FIGS. 1-5, it can be seen that the inner plate 30 includes a plurality of adjustment members 37*a*, 37*b*, 37*c*, 37*d* which extend outwardly from the respective four corners of the inner plate 30. As best shown in FIG. 1, a first adjustment member 37*a* is positioned at the corner between the first side 23 and upper end 21 of the inner plate 30, a second adjustment member 37*b* is positioned at the corner between the second side 24 and upper end 21 of the inner plate 30, a third adjustment member 37*c* is positioned at the corner between the first side 23 and lower end 22 of the inner plate 30, and a fourth adjustment member 37*d* is positioned at the corner between the second side 24 and lower end 22 of the inner plate 30.

Each of the adjustment members 37*a*, 37*b*, 37*c*, 37*d* generally comprises an elongated member such as a tube, shaft, post, pole, or the like along which the outer plate 40 may be adjusted either towards or away from the inner plate 30. The distal end of each of the adjustment members 37*a*, 37*b*, 37*c*, 37*d* thus includes a stopper 38*a*, 38*b*, 38*c*, 38*d* which functions to prevent the inner plate 30 from being completely pulled off of the adjustment members 37*a*, 37*b*, 37*c*, 37*d*.

As best shown in FIG. 1, the first adjustment member 37*a* includes a first stopper 38*a*, the second adjustment member 37*b* includes a second stopper 38*b*, the third adjustment member 37*c* includes a third stopper 38*c*, and the fourth adjustment member 37*d* includes a fourth stopper 38*d*. Each of the stoppers 38*a*, 38*b*, 38*c*, 38*d* may comprise a nut or other type of blockage which prevents the brackets 41*a*, 41*b*, 41*c*, 41*d* of the outer plate 40 from sliding off the distal end of each of the adjustment members 37*a*, 37*b*, 37*c*, 37*d* as discussed below.

As best shown in FIGS. 1-5, the mount 20 includes an outer plate 40 which is positioned parallel to and distally-spaced with respect to the inner plate 30. The outer plate 40 may be adjusted inwardly or outwardly with respect to the inner plate 30 by a pair of actuators 42, 43 as discussed herein. Additionally, the outer plate 40 may be rotated with respect to the inner plate 30 by a pair of rotator actuators 46*a*, 46*b* as discussed below. In these respects, the shaft 50 and spray head 60, which are connected to the outer plate 40, may be adjusted in/out and rotatably.

As best shown in FIGS. 1-5, the outer plate 40 is adjustably connected to the inner plate 30 by the adjustment members 37*a*, 37*b*, 37*c*, 37*d*. The outer plate 40 includes a plurality of brackets 41*a*, 41*b*, 41*c*, 41*d* which are movably connected to the adjustment members 37*a*, 37*b*, 37*c*, 37*d*. Each of the brackets 41*a*, 41*b*, 41*c*, 41*d* are illustrated as comprising tubular members through which each of the adjustment members 37*a*, 37*b*, 37*c*, 37*d* extend. Thus, the outer plate 40 may be moved inwardly towards the inner plate 30 or outwardly away from the inner plate 30 along the adjustment members 37*a*, 37*b*, 37*c*, 37*d*.

As best shown in FIG. 1, a first bracket 41*a* is fixedly connected to the outer plate 40 and movably connected to the first adjustment member 37*a*, a second bracket 41*b* is fixedly connected to the outer plate 40 and movably connected to the second adjustment member 37*b*, a third bracket 41*c* is fixedly connected to the outer plate 40 and movably connected to the third adjustment member 37*c*, and a fourth bracket 41*d* is fixedly connected to the outer plate 40 and movably connected to the fourth adjustment member 37*d*. It should be appreciated, however, that less adjustment members 37*a*, 37*b*, 37*c*, 37*d*, and thus less brackets 41*a*, 41*b*, 41*c*, 41*d*, may be utilized in different embodiments.

As best shown in FIGS. 1-3, a pair of actuators 42, 43 may be utilized to adjust the outer plate 40, and thus the interconnected shaft 50 and spray head 60, either inwardly towards the inner plate 30 or outwardly away from the inner plate 40. In this manner, the spray head 60 may be adjusted inwardly or outwardly without any movement of the arm 13 of the vehicle 12 and thus independently thereof. While a pair of actuators 42, 43 are shown in the figures, it should be appreciated that more or less actuators 42, 43 may be utilized. In some embodiments, the inward and outward adjustment of the outer plate 40 may instead be manual.

With respect to the embodiment shown in FIGS. 1-3, it can be seen that a first actuator 42 is connected between the inner plate 30 and the outer plate 40. The first actuator 42 is anchored at its first end to the inner plate 30 by a first actuator anchor 48*a*, such as a bracket or other connection point. In some embodiments, the first actuator 42 may instead be welded directly onto the inner plate 30 or connected thereto by fasteners, adhesives, and the like.

Continuing to reference FIGS. 1-3, it can be seen that the first actuator 42 extends through the outer plate 40. More specifically, a first actuator rod 49*a* may extend through the outer plate 40 and connected at its end to the first actuator anchor 48*a*. When the first actuator 42 is extended, the first actuator rod 49*a* will extend outwardly and thus push the outer plate 40 away from the inner plate 30. When the first actuator 42 is retracted, the first actuator rod 49*a* will retract inwardly and thus pull the outer plate 40 towards the inner plate 30.

Continuing to reference the embodiment shown in FIGS. 1-3, it can be seen that a second actuator 43 is connected between the inner plate 30 and the outer plate 40. The second actuator 43 is anchored at its first end to the inner plate 30 by a second actuator anchor 48*b*, such as a bracket or other connection point. In some embodiments, the second actuator 43 may instead be welded directly onto the inner plate 30 or connected thereto by fasteners, adhesives, and the like.

Continuing to reference FIGS. 1-3, it can be seen that the second actuator 43 extends through the outer plate 40. More specifically, a second actuator rod 49*b* may extend through the outer plate 40 and connected at its end to the second actuator anchor 48*b*. When the second actuator 43 is extended, the second actuator rod 49*b* will extend outwardly and thus push the outer plate 40 away from the inner plate 30. When the second actuator 43 is retracted, the second actuator rod 49*b* will retract inwardly and thus pull the outer plate 40 towards the inner plate 30.

While the figures illustrate the use of a pair of actuators 42, 43 being utilized for inward and outward adjustment, it should be appreciated that more or less actuators 42, 43 may be utilized. Additionally, the positioning and orientation of the actuators 42, 43 may vary in different embodiments. Thus, the exemplary embodiment shown in FIGS. 1-3, in which the first actuator 42 is positioned on a first side of the rotator 44 and the second actuator 43 is positioned on a second side of the rotator 44, is not intended to be limiting in scope.

As best shown in FIGS. 1-3, the mount 20 may include one or more guide members 32*a*, 32*b* which act as a guide or track on which the outer plate 40 is adjusted inwardly or outwardly with respect to the inner plate 30. In the exemplary embodiment best shown in FIG. 1, it can be seen that a first guide member 32*a* extends outwardly from the inner plate 30 of the mount 20 near the first side 23 of the mount 20 and that a second guide member 32*b* extends outwardly from the inner plate 30 of the mount 20 near the second side 24 of the mount 20.

Each of the guide members 32*a*, 32*b* may comprise an elongated bar or the like which extends perpendicularly with respect to the inner plate 30 of the mount 20. The guide members 32*a*, 32*b* may include flanges such as shown in the figures on which one or more guide rollers 34*a*, 34*b* may engage such that the flanges function as a track for the guide rollers 34*a*, 34*b* when the outer plate 40 is being adjusted inwardly or outwardly with respect to the inner plate 30 such as shown in FIGS. 2 and 3.

Continuing to reference FIGS. 2 and 3, it can be seen that the guide rollers 34*a*, 34*b* are rotatably connected to a pair of guide brackets 33*a*, 33*b*, with first guide rollers 34*a* being rotatably connected to a first guide bracket 33*a* and second guide rollers 34*b* being rotatably connected to a second guide bracket 33*b*. The first guide bracket 33*a* is generally connected to or near a first side of the outer plate 40 and the second guide bracket 33*b* is generally connected to or near a second side of the outer plate 40. The guide brackets 33*a*, 33*b* are positioned such that the guide rollers 34*a*, 34*b* may rotate along the upper end of the guide members 32*a*, 32*b* such as shown in FIGS. 2 and 3.

The number of guide rollers 34*a*, 34*b* used on each of the guide brackets 33*a*, 33*b* may vary in different embodiments. The exemplary embodiment shown in the FIGS. illustrate the use of a pair of first guide rollers 34*a* on the first guide bracket 33*a* and a pair of second guide rollers 34*b* on the second guide bracket 33*b*. It should be appreciated that more or less guide rollers 34*a*, 34*b* could be rotatably connected to the guide brackets 33*a*, 33*b* in different embodiments.

The guide brackets 33*a*, 33*b* may be connected to the mount 20, such as by welding, fasteners, adhesives, or the like, or may be integrally formed therewith. The guide brackets 33*a*, 33*b* will generally be positioned between the upper adjustment members 37*a*, 37*b* and the lower adjustment members 37*c*, 37*d* as shown in the figures. However, the positioning of the guide brackets 33*a*, 33*b* may vary in different embodiments.

When the outer plate 40 is adjusted inwardly or outwardly with respect to the inner plate 30, the guide rollers 34*a*, 34*b* will traverse along the respective guide members 32*a*, 32*b*, with the guide members 32*a*, 32*b* acting as a track to guide movement of the outer plate 40 with respect to the inner plate 30. Thus, the guide members 32*a*, 32*b* may function as a structural support, guide, and track for the mount 20 when the mount 20 is being adjusted inwardly or outwardly such as shown in FIGS. 2 and 3.

Figure 4:
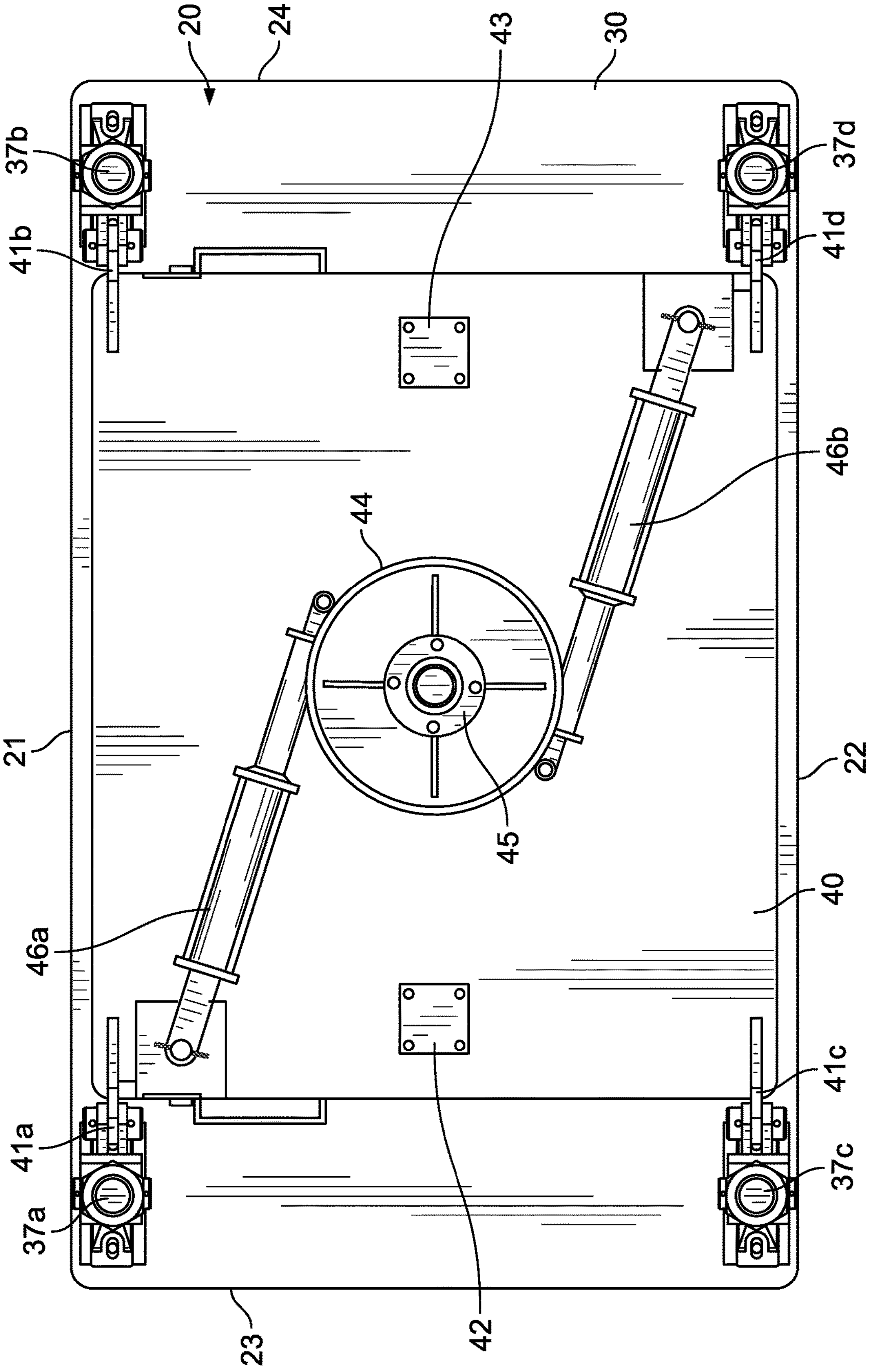
FIG. 4 is a frontal view of a mount of a cavity cleaning and coating system in accordance with an example embodiment.
Figure 5:
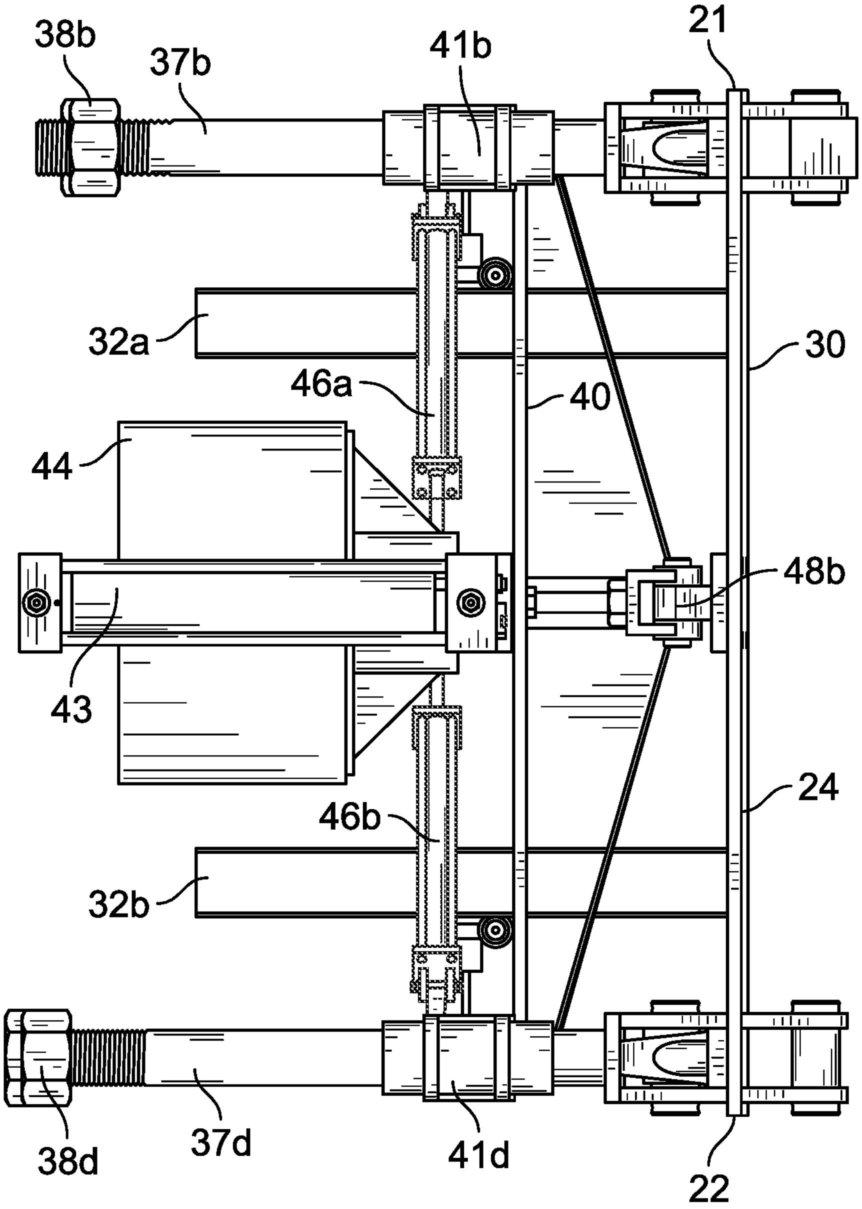
FIG. 5 is a side view of a mount of a cavity cleaning and coating system in accordance with an example embodiment.

As best shown in FIG. 4, the mount 20 may be rotatable about the center of the mount 20 in both clockwise and counterclockwise directions. A central rod 29 is connected to the outer plate 40 of the mount 20 such as shown in FIG. 4. The central rod 29 extends through a bearing 45 such that the central rod 29 may rotate within the bearing 45. The central rod 29 may be attached to just the outer plate 40 such as shown in the figures, or in an alternate embodiment may extend through the outer plate 40 and attach to the inner plate 30.

A rotator 44, such as a cylindrical member as shown in FIG. 4, is centrally positioned on the outer surface of the outer plate 40, with the central rod 29 extending through the center of the rotator 44. The rotator 44 is secured to the central rod 29 such that the central rod 29 rotates with the rotator 44. As best shown in FIG. 4, a pair of rotator actuators 46*a*, 46*b* may be utilized for rotating the mount 20 in either a clockwise or a counterclockwise direction about the central rod 29.

Continuing to reference FIG. 4, it can be seen that a first rotator actuator 46*a* is positioned diagonally between a point near an upper corner of the inner plate 30 and the rotator 44. Similarly, a second rotator actuator 46*b* is positioned diagonally between a point near a lower corner of the inner plate 30 and the rotator 44. In the embodiment shown in the figures, extending the rotator actuators 46*a*, 46*b* rotates the mount 20 in a clockwise direction. Conversely, retracting the rotator actuators 46*a*, 46*b* functions to rotate the mount 20 in a counterclockwise direction. It should be appreciated that, in some embodiments, only a single rotator actuator 46*a*, 46*b* may be utilized.

As shown in FIG. 4, the first rotator actuator 46*a* is connected at its first end to a first rotator anchor 28*a* and at its second end to the rotator 44. In such an embodiment, the first rotator actuator 46*a* may be directly connected to the rotator 44, such as by welding, fasteners, adhesives, or the like, or may be connected to a first connector 47*a* such as an elongated member (e.g., a rod, pole, post, shaft, or the like) that is attached to the rotator 44 and to the outer plate 40.

Similarly, the second rotator actuator 46*b* is connected at its first end to a second rotator anchor 28*b* and at its second end to the rotator 44. In such an embodiment, the second rotator actuator 46*b* may be directly connected to the rotator 44, such as by welding, fasteners, adhesives, or the like, or may be connected to a second connector 47*b* such as an elongated member (e.g., a rod, pole, post, shaft, or the like) that is attached to the rotator 44 and to the outer plate 40.

Continuing to reference FIG. 4, it can be seen that each of the rotator anchors 28*a*, 28*b* may comprise a hinged bracket or the like to which the first ends of the respective rotator actuators 46*a*, 46*b* are hingedly connected. Similarly, the second ends of the respective rotator actuators 46*a*, 46*b* may be hingedly connected to the connectors 47*a*, 47*b* of the rotator 44.

By utilizing the rotator actuators 46*a*, 46*b*, the mount 20, including both the inner and outer plates 30, 40, may be rotatably adjusted in both a clockwise and a counterclockwise direction. The first and second actuators 42, 43 may be utilized to adjust the outer plate 40 inwardly or outwardly with respect to the inner plate 30.

As the shaft 50 and interconnected spray head 60 are connected to the outer plate 40, such as by the central rod 29 and/or rotator 44, the shaft 50 and spray head 60 may be moved inwardly, outwardly, rotatably in a clockwise direction, rotatably in a counterclockwise direction, to a first side, or to a second side. Thus, the spray head 60 may be optimally positioned to clean and/or coat a cavity 18 with fine-tuned precision and without movement of the arm 13 of the vehicle 12.

D. Shaft

As best shown in FIGS. 6, 7, and 11-16, the cavity cleaning and coating system includes a shaft 50 which may be lowered into a cavity 18 and raised up out of the cavity 18. The length of the shaft 50 may vary in different embodiments depending on the depth of the cavities 18 being cleaned/coated, the type of vehicle 12 being used, and other considerations. Thus, the length of the shaft 50 should not be construed as limited by the exemplary embodiment shown in the figures.

As best shown in FIG. 6, the shaft 50 will generally be positioned in a vertical position when the cavity cleaning and coating system is in use. When not in use, the shaft 50 may be raised into a horizontal position by the arm 13 of the vehicle 12 so as to reduce the overhead clearance needed to accommodate the shaft when in transit or in storage as shown in FIG. 7.

As shown in FIGS. 6, 7, and 11-16, the shaft 50 may extend through a shaft housing 51 or sheathing which substantially surrounds the shaft 50. The shaft housing 51 may comprise a frame or cage which is positioned around the shaft 50 and within which the shaft 50 may be raised or lowered. A plurality of rollers 52 are thus fixedly connected to the shaft housing 51 so as to effectuate and guide the vertical movement of the shaft 50 within the shaft housing 51.

In the exemplary embodiment shown in FIGS. 6, 7, and 11-16, it can be seen that the rollers 52 are positioned on four sides of the shaft 50 at various intervals along the length of the shaft 50. The number of rollers 52 and their positioning along the shaft 50 and shaft housing 51 may vary in different embodiments and thus should not be construed as limited by the exemplary figures. For example, the rollers 52 need not be on all sides of the shaft 50 in certain embodiments.

The figures illustrate that each of the rollers 52 may comprise a rolling member such as a wheel which is connected to the shaft housing 51 by brackets and fasteners. It should be appreciated that the manner in which the rollers 52 are connected to the shaft housing 51 may vary in different embodiments. In some embodiments, the axle of each of the rollers 52 may be directly connected to the shaft housing 51, such as by welding, fasteners, adhesives, or the like. Each of the rollers 52 may comprise a circular member such as a wheel or the like which engages with the shaft 50 such that the shaft 50 may freely move up and down as shown in FIGS. 12 and 13.

Figure 12:
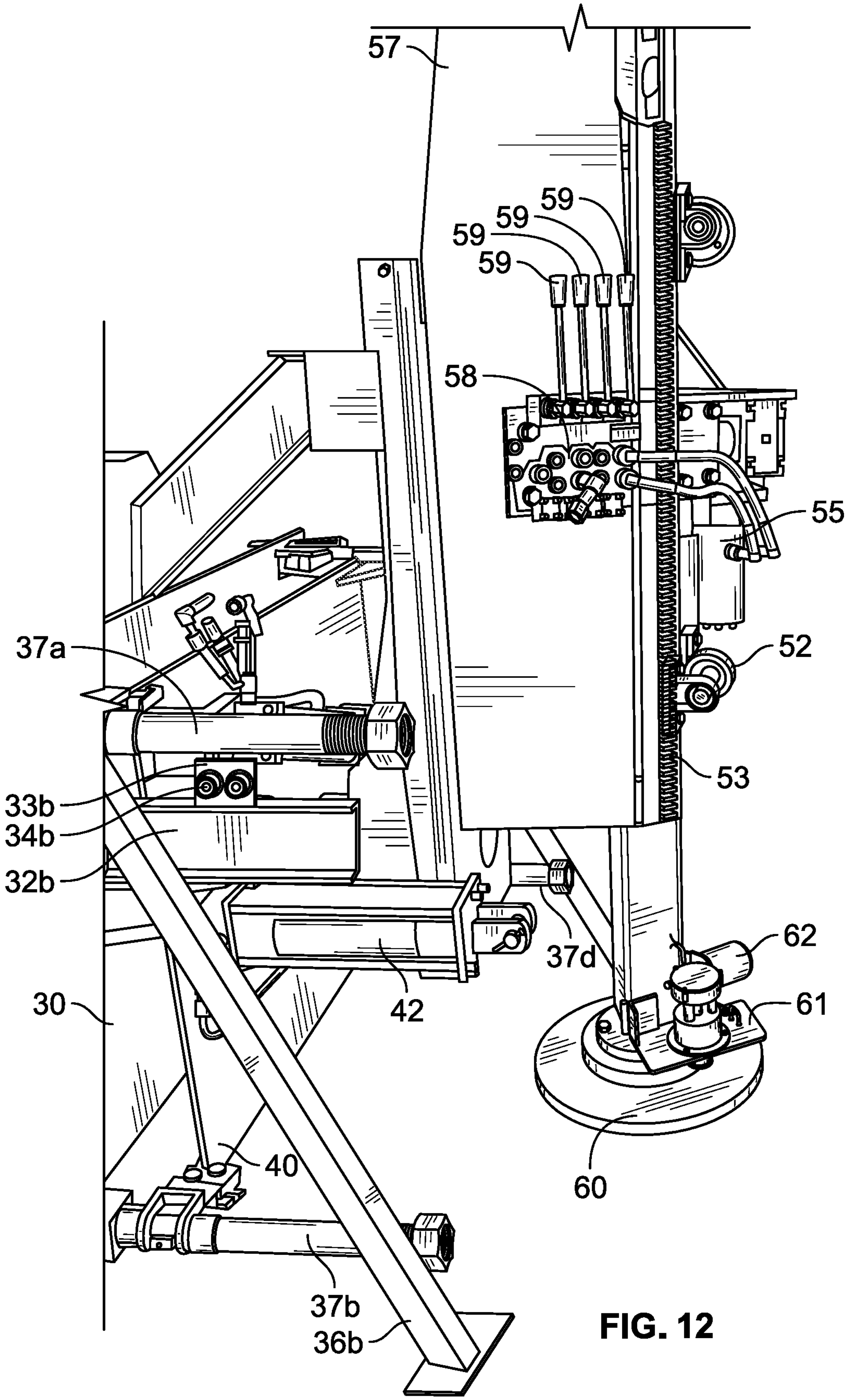
FIG. 12 is a perspective view of a mount and shaft of a cavity cleaning and coating system in accordance with an example embodiment.
Figure 13:
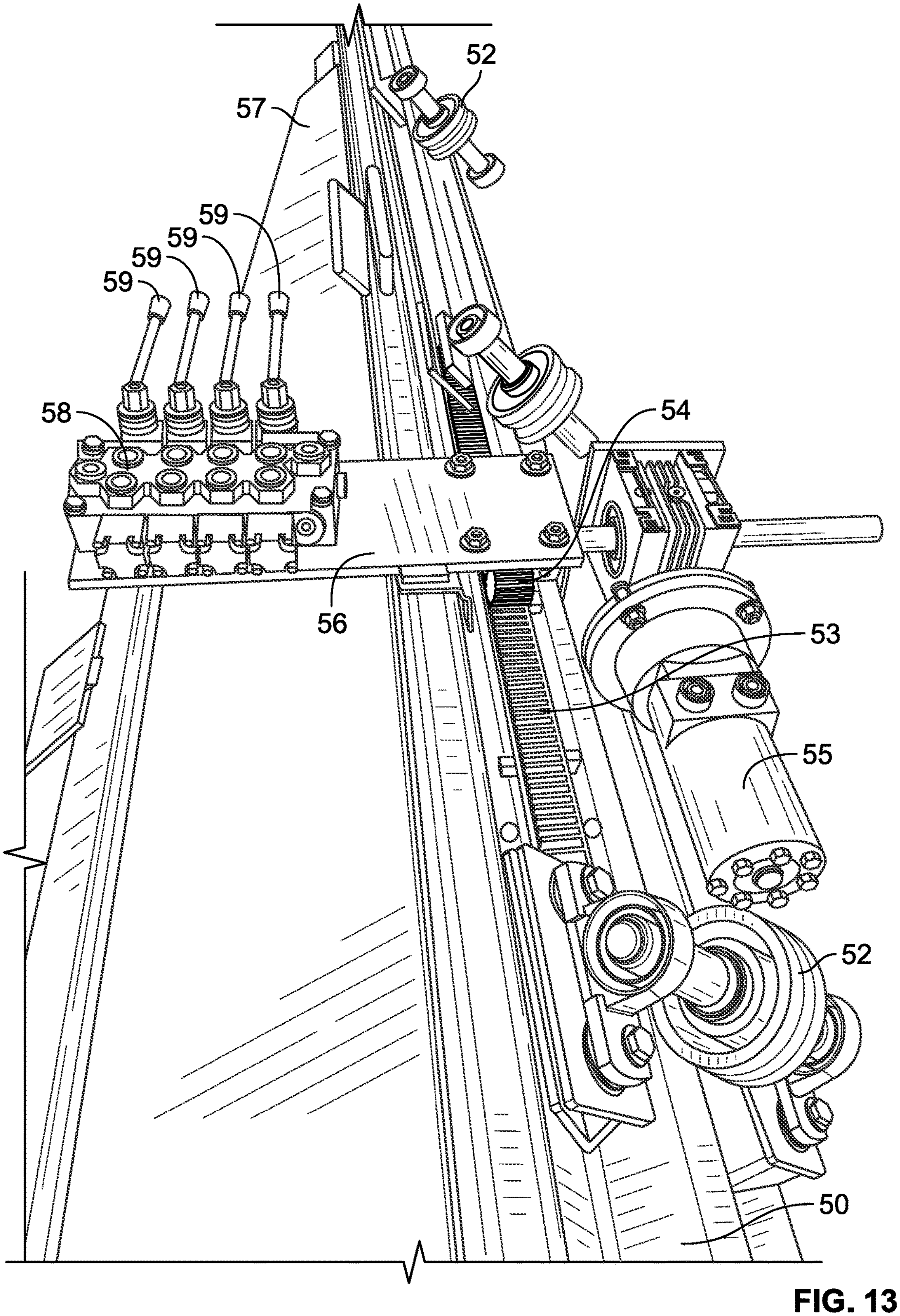
FIG. 13 is a perspective view of a shaft of a cavity cleaning and coating system in accordance with an example embodiment.
Figure 14:
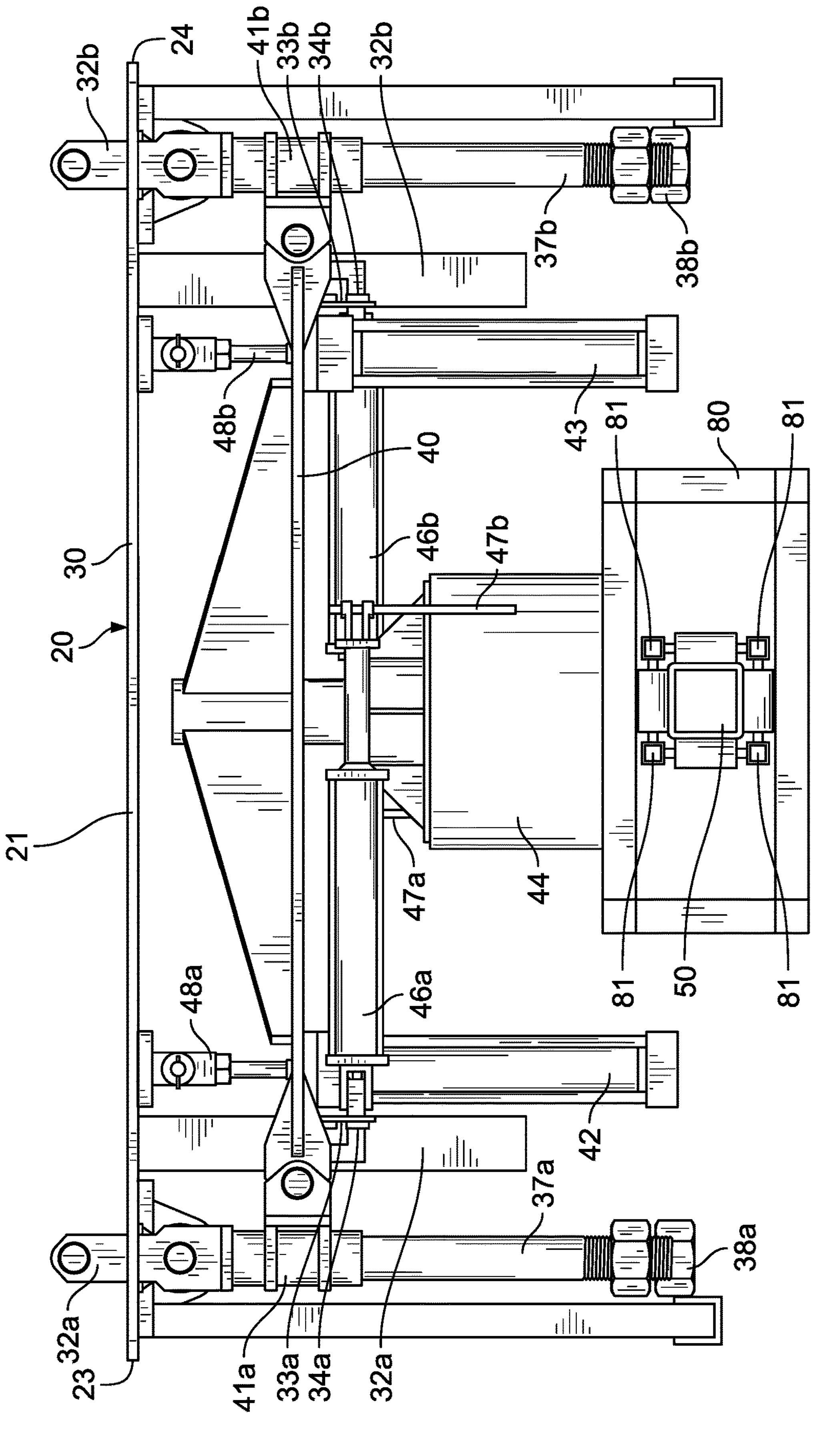
FIG. 14 is a top view of a mount and shaft of a cavity cleaning and coating system in accordance with an example embodiment.

As best shown in FIGS. 12 and 13, the shaft 50 may be raised or lowered with respect to the shaft housing 51 by use of a linear actuator, such as a rack 53 and pinion 54 system. FIGS. 12 and 13 illustrate an exemplary rack 53 which extends along at least a portion of the length of the shaft 50. In some embodiments, the rack 53 may extend for the entire length of the shaft 50. In other embodiments, the rack 53 may extend for only part of the length of the shaft 50. Additionally, the positioning of the rack 53 on the shaft 50 may vary, and should not be construed as limited by the exemplary positioning shown in the figures.

The rack 53 will generally comprise a linear gear which extends along at least a portion of the length of the shaft 50. The rack 53 thus includes a plurality of spaced-apart teeth with which the pinion 54 is adapted to engage so as to move the shaft 50 upwardly or downwardly, depending upon the rotational direction of the pinion 54. The pinion 54 will generally comprise a helical gear which engages with the linear gear of the rack 53 so as to cause the rack 53 (and the shaft 50 to which it is attached) to be driven linearly.

Rotation of the pinion 54 in a first direction causes the rack 53 and interconnected shaft 50 to move upwardly within the shaft housing 51. Rotation of the pinion 54 in a second, opposite direction causes the rack 53 and interconnected shaft 50 to move downwardly within the shaft housing 51. As best shown in FIG. 13, a pinion motor 55 may be utilized to drive the pinion 54 so as to rotate the pinion 54 in either direction as needed to raise or lower the shaft 50. The number of pinion motors 55 may vary in different embodiments.

In some embodiments, multiple pinion motors 55 may be utilized. Further, the positioning and orientation of the pinion motor 55 may vary in different embodiments, and should not be construed as limited by the exemplary embodiment shown in the figures. In some embodiments, the pinion 54 may comprise multiple helical gears which are interconnected, with one of the multiple helical gears being directly driven by the pinion motor 55, and the remaining helical gears being driven passively.

As best shown in FIGS. 12 and 13, a controller 58 may be provided for controlling the various actuators 42, 43, 46*a*, 46*b* of the cavity cleaning and coating system. The controller 58 will generally be positioned near the lower end of the shaft housing 51 so that the controller 58 may be reached by an operator without need for a ladder or the like. The controller 58 may be secured to the shaft housing 51 by a controller mount 56 such as a plate or bracket as shown in the figures. The controller mount 56 may also cover the pinion 54 such as shown in FIG. 13, thus acting as a guard for the pinion 54.

The positioning of the controller 58 may vary in different embodiments. The figures illustrate that the controller 58 is connected to the shaft housing 51 by the controller mount 56 being secured to the shaft housing 51 near the lower end of the shaft housing 51. In some embodiments, the controller 58 may comprise a remote that is not directly connected to any other structure. In other embodiments, the controller 58 may be positioned within the cab of the vehicle 12 or may be attached to various other structures of the cavity cleaning and coating system. However, it is preferable that the controller 58 be connected to a non-movable structure (e.g., the shaft housing 51).

As shown in FIG. 13, the controller 58 will generally comprise a plurality of control levers 59. Each of the control levers 59 may be utilized to control one or more of the actuators 42, 43, 46*a*, 46*b* and/or motors 55, 62 of the cavity cleaning and coating system. The figures illustrate an embodiment in which a plurality of control levers 59 are utilized: a first control lever 59 is utilized to control the first and second actuators 42, 43, a second control lever 59 is utilized to control the rotator actuators 46*a*, 46*b*, and a third control lever 59 is utilized to control the pinion motor 55 which drives the linear actuator (rack 53 and pinion 54). Various other control configurations may be utilized in different embodiments.

It should be appreciated that the various actuators 42, 43, 46*a*, 46*b* may comprise various types of motors or actuators. The figures illustrate that the actuators 42, 43, 46*a*, 46*b* comprise hydraulic actuators. However, in various embodiments, electrical, pneumatic, or gas-driven actuators 42, 43, 46*a*, 46*b* may be utilized. Thus, the type of actuators 42, 43, 46*a*, 46*b* used should not be construed as limiting in scope.

As best shown in FIGS. 15 and 16, the shaft housing 51 may include a shielding 57 to prevent injury to any operators standing near the shaft housing 51 when in operation. The shielding 57 may cover one or more sides of the shaft housing 51 at or near the lower end of the shaft housing 51. The shielding 57 comprises a plate or other member adapted to cover the movable shaft 50 and thus prevent injuries related to contacting the shaft 50 when in motion. In some embodiments, the shielding 57 may cover the entire length of the shaft housing 51. In other embodiments such as shown in the figures, the shielding 57 may only cover part of the length of the shaft housing 51 such as shown in the figures. By way of example, the shielding 57 may cover the first seven feet of length of the shaft housing 51 to prevent injury to any operators.

In some embodiments such as shown in FIG. 15, the shaft housing 51 may include a brace 26 connected to the shaft housing 51 on the side facing the mount 20 and arm 13 of the vehicle 12. The brace 26 may comprise a bracket or other type of connector which is connected between the shaft housing 51 and the mount 20 for increased structural integrity. In the exemplary embodiment in FIG. 16, it can be seen that the arm 13 of the vehicle 12, the central rod 29, and the rotator 44 are each attached to the brace 26, with the brace 26 being attached on its opposite side to the shaft housing 51.

E. Spray Head

As best shown in FIGS. 8-12, the lower end of the shaft 50 includes a spray head 60 which is adapted to be lowered into the cavity 18 to dispense various types of fluids within the cavity 18. The shape and size of the spray head 60 will vary between different embodiments to suit different types of cavities 18. For example, narrower cavities 18 may require a narrower spray head 60 while wider cavities 18 may require a wider spray head 60. In some embodiments, the spray head 60 may be removably attached to the shaft 50 such that multiple spray heads 60 may be interchangeably used to accommodate different types of cavities 18.

Figure 8:
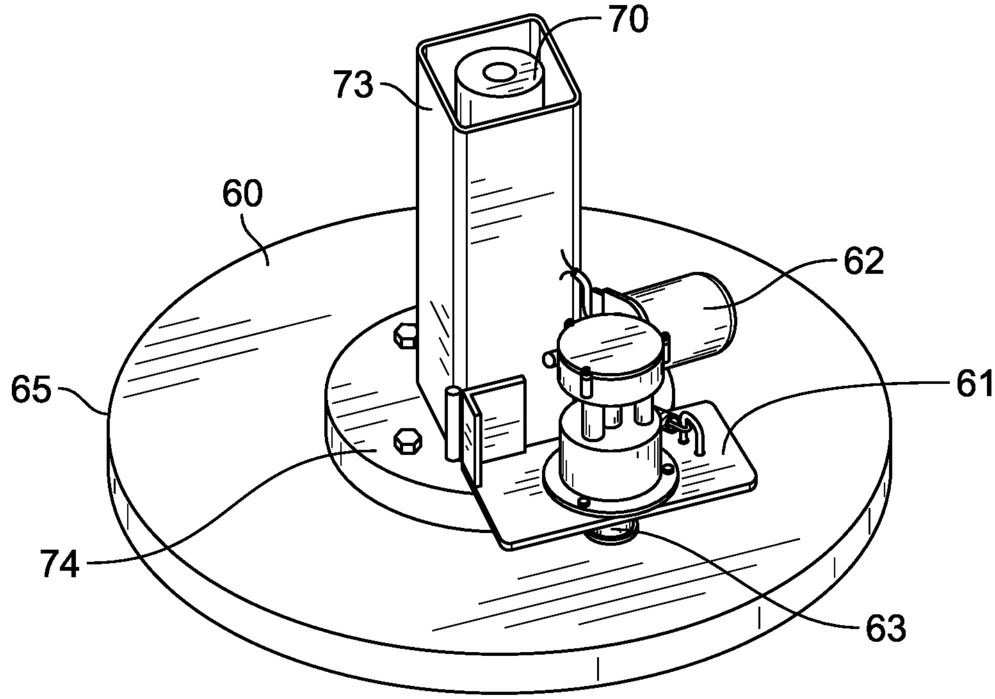
FIG. 8 is a perspective view of a spray head of a cavity cleaning and coating system in accordance with an example embodiment.
Figure 9:
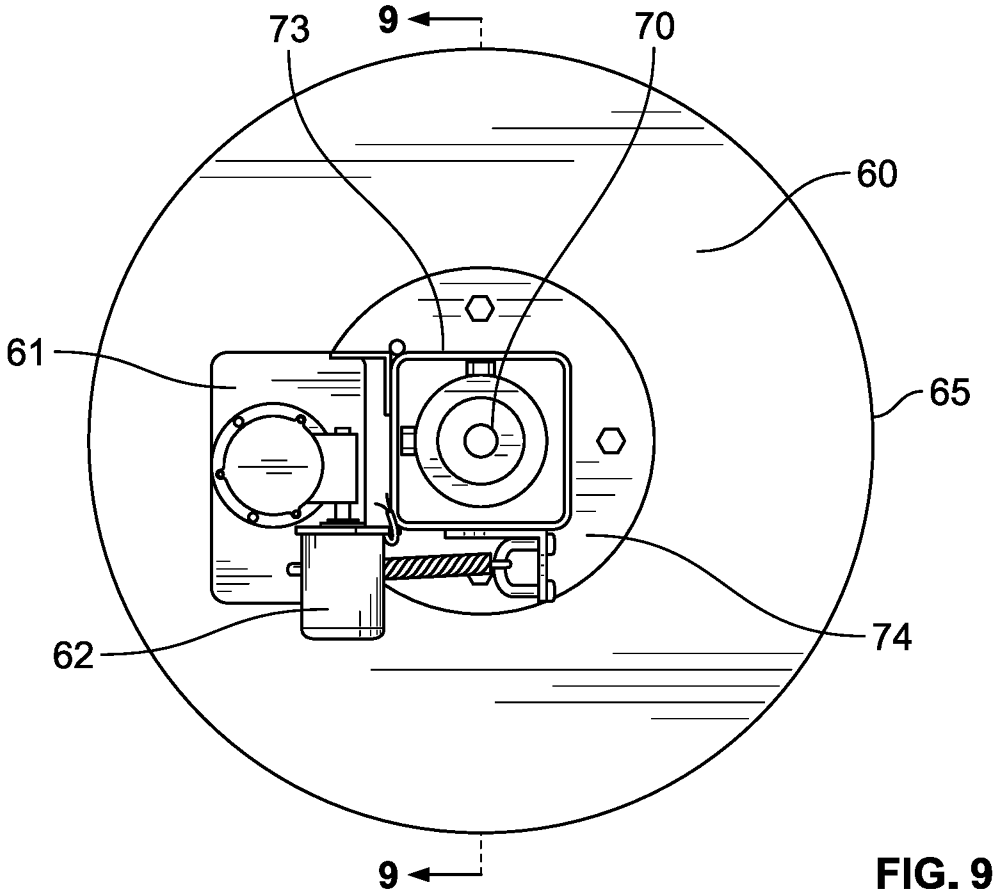
FIG. 9 is a top view of a spray head of a cavity cleaning and coating system in accordance with an example embodiment.
Figure 10:
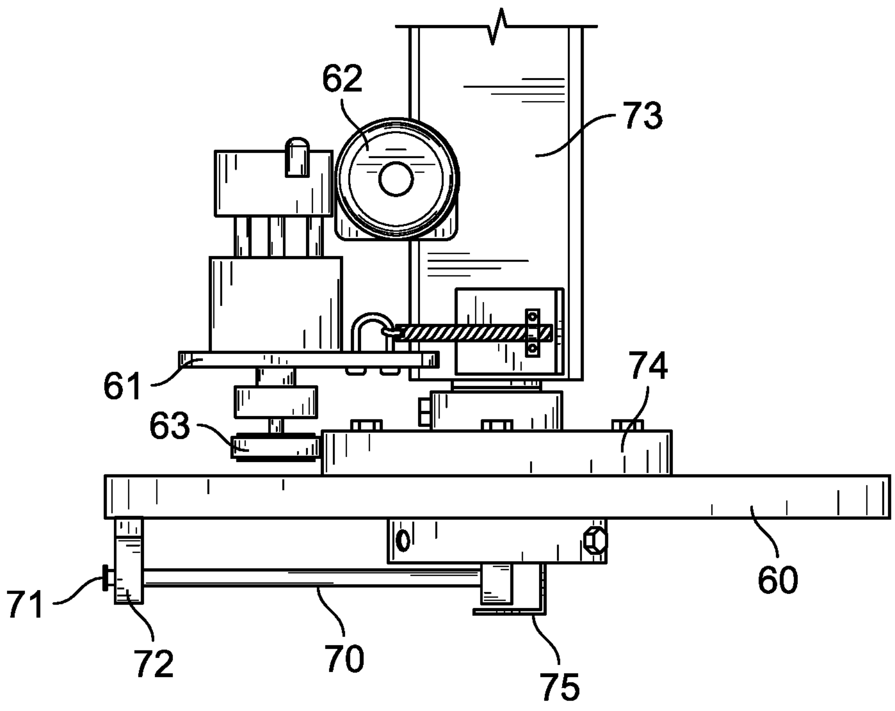
FIG. 10 is a front view of a spray head of a cavity cleaning and coating system in accordance with an example embodiment.
Figure 11:
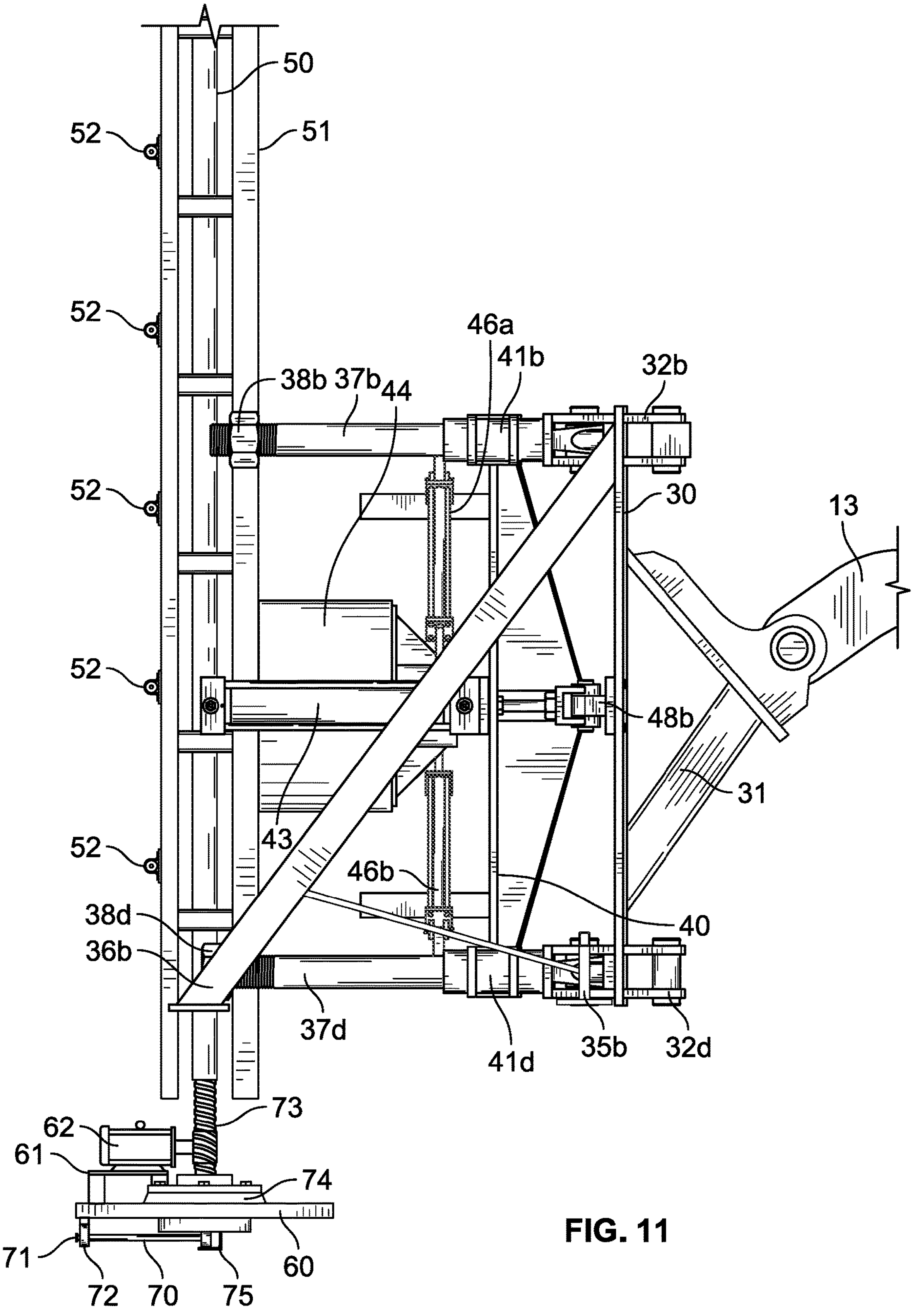
FIG. 11 is a side view of a mount and shaft of a cavity cleaning and coating system in accordance with an example embodiment.

The spray head 60 may will generally comprise an outer circumference 65, an upper end 66, a lower end 67, and a central opening 68 such as shown in FIGS. 8-10. In the exemplary embodiment best shown in FIGS. 8-10, it can be seen that the spray head 60 generally comprises a disk-shaped member having a rotator shaft 73 extending upwardly therefrom. The rotator shaft 73 is connected to the lower end of the shaft 50 so as to connect the spray head 60 to the shaft 50. In other embodiments, the spray head 60 may be directly connected to the shaft 50.

The spray head 60 is adapted to be rotated while fluids are dispensed within the cavity 18. The spray head 60 thus may include a motor 62 which is mounted to the spray head 60 by a motor mount 61, such as a bracket, plate, or the like. The motor 62 is generally positioned above the upper end 66 of the spray head 60, though the motor 62 could be positioned at various other locations in different embodiments. The motor 62 is adapted to drive a drive member 63, which engages with the spray head 60 to rotate the spray head 60. The drive member 63 may comprise a small wheel or other rotatable member which engages with the spray head 60. As the drive member 63 is rotated by the motor 62, the drive member 63 will drive rotation of the spray head 60.

The spray head 60 may include a swivel 74 such as shown in FIG. 8 to effectuate rotation of the spray head 60. In some embodiments, the swivel 74 will be directly rotated, with the outer circumference 65 of the spray head 60 remaining stationary. Thus, the drive member 63 may engage directly with the swivel 74 in certain embodiments.

As best shown in FIG. 9, a spray hose 70 will generally extend through the central opening 68 of the spray head 60, exiting at the lower end 67 of the spray head 60. The spray hose 70 will then be turned at a right angle to be secured to the lower end 67 of the spray head 60 at or near the outer circumference 65 of the spray head 60. A mount 72 such as a bracket is utilized to secure the spray hose 70 to the lower end 67 of the spray head 60 such as shown in FIG. 10. A guard 75 may be positioned over a portion of the spray hose 70 on the lower end 67 of the spray head 60 to protect the spray hose 70 from damage. In some embodiments, the guard 75 may be omitted. In other embodiments, the guard 75 may cover the entirety of the spray hose 70 on the lower end 67 of the spray head 60, rather than only the right angle turn as shown in the figures.

As best shown in FIG. 10, the distal end of the spray hose 70 will generally comprise a dispenser 71 such as a spray nozzle. The fluids are dispensed from the dispenser 71. In some embodiments, the dispenser 71 may be adapted to spray the fluids. In other embodiments, the dispenser 71 may simply emit a stream of the fluids. Various types of dispensers 71 may be utilized so long as the fluids are dispensed therefrom.

Generally, the spray hose 70 will be routed from the lower end 67 of the spray head 60 up through the central opening 68 thereof. The spray hose 70 is generally connected to a reservoir of fluid. The reservoir may be positioned at various locations, such as but not limited to a trailer that is connected to the vehicle 12. In other embodiments, the reservoir may instead be connected to the shaft housing 51, or other locations. The reservoir may be interchangeable. For example, a first reservoir may be utilized for water and a second reservoir may be utilized for coatings such as paint or epoxies such as H2S epoxy. In such embodiments, the reservoir will be removed and replaced as needed when different fluids are needed during the cleaning and coating process as discussed below.

F. Operation of Preferred Embodiment

In use, the vehicle 12 is first moved into position near the cavity 18. Generally, the shaft 50 will be in its raised, horizontal position prior to use such as shown in FIG. 7. When positioned near the cavity 18 to be treated, the shaft 50 will be lowered into its vertical position such as shown in FIGS. 6, 15, and 16, with the spray head 60 being positioned over the cavity 18. Upon reaching the cavity 18, the arm 13 of the vehicle 12 is locked as fine-tuned positioning will be performed by adjustment of the mount 20 independently of the arm 13 of the vehicle 12.

With the vehicle 12 positioned near the cavity 18, an operator will generally move over to the controller 58 to adjust the attitude of the mount 20 as needed to ensure optimal positioning of the spray head 60 prior to lowering the spray head 60 into the cavity 18 for treatment. The mount 20 may be moved inwardly or outwardly (e.g., towards or away from the vehicle 12) by use of the first and second actuators 42, 43.

Extension of the first and second actuators 42, 43, such as by manipulation of one or more of the control levers 59 of the controller 58, will push the mount 20 outwardly away from the vehicle 12. Retracting the first and second actuators 42, 43 will pull the mount 20 inwardly towards the vehicle 12. More specifically, the outer plate 40 will be pushed away from, or pulled towards, the inner plate 30. As the shaft 50 is connected to the outer plate 40, movement of the outer plate 40 will be imparted to the shaft 50 such that, when the outer plate 40 moves outwardly, the shaft 50 will move outwardly, and when the outer plate 40 moves inwardly, the shaft 50 will move inwardly.

The shaft 50 may also be rotated either clockwise or counterclockwise with respect to the mount 20 by use of the rotator actuators 46*a*, 46*b*. Extension of the rotator actuators 46*a*, 46*b*, such as by manipulation of one or more of the control levers 59 of the controller 58, will rotate the shaft 50 with respect to the mount 20 in a first direction. Retraction of the rotator actuators 46*a*, 46*b* will rotate the shaft 50 with respect to the mount 20 in a second, opposite direction.

By utilizing the various actuators 42, 43, 46*a*, 46*b*, the orientation (attitude) and positioning of the mount 20 may be fine-tuned without use of the arm 13 of the vehicle 12. Adjustment of the mount 20 is imparted to the spray head 60 such that, when the mount 20 is moved in a certain direction, the spray head 60 is also moved in that same direction. Thus, the spray head 60 may be adjusted inwardly, outwardly, or rotationally independently of the arm 13 of the vehicle 12. An operator will utilize this functionality to properly orient and position the spray head 60 optimally for the cavity 18 to be treated without any manipulation of the arm 13 of the vehicle 12.

With the spray head 60 optimally positioned, the pinion motor 55 may be activated to drive the shaft 50 downwardly into the cavity 18 such as shown in FIG. 16. The pinion motor 55 drives the pinion 54, which engages with the rack 53 to lower the shaft 50 and spray head 60 down into the cavity 18. The spray hose 70 is activated such that fluid is dispensed from the dispenser 71 as the spray head 60 is lowered into the cavity 18. The motor 62 of the spray head 60 may be activated to rotate the dispenser 71 such that the fluid is applied evenly across all interior surfaces of the cavity 18.

The spray head 60 may be repeatedly lowered and raised within the cavity 18 while the dispenser 71 rotates and dispenses the fluid to treat the cavity 18. Once the interior surfaces of the cavity 18 are fully coated, the dispenser 71 may be deactivated so as to no longer dispense fluids and no longer rotate. The pinion motor 55 may be activated to raise the shaft 50 and spray head 60 out of the cavity 18. The vehicle 12 may then be moved to another cavity 18 or, if all treatments are completed, the arm 13 may be raised so as to raise the shaft 50 into a horizontal position for transport or storage without concern for overhead clearance to accommodate the height of the shaft 50.

In a preferred embodiment, each cavity 18 will be treated twice: once with a cleaner and once with a coating. For example, each cavity 18 may be first pressure-washed with water or a cleaning solution. The water or cleaning solution is then allowed to dry within the cavity 18, which may take a period of days. After drying, the vehicle 12 is returned to the same cavity 18 and the process is repeated with a coating such as paint or epoxy such as H2S epoxy. Thus, on the second pass, a different reservoir of fluids may be utilized. In this manner, the cavity 18 may be both cleaned and coated by the cavity cleaning and coating system.

Unless otherwise defined, all technical and scientific terms used herein have the same meaning as commonly understood by one of ordinary skill in the art to which this invention belongs. Although methods and materials similar to or equivalent to those described herein can be used in the practice or testing of the cavity cleaning and coating system, suitable methods and materials are described above. All publications, patent applications, patents, and other references mentioned herein are incorporated by reference in their entirety to the extent allowed by applicable law and regulations. The cavity cleaning and coating system may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A cavity cleaning and coating system, comprising:

a mount connectable to an arm of a vehicle by a loader coupling, the arm being capable of raising and lowering the mount, and the mount being independently adjustable relative to the arm of the vehicle;

a shaft coupled to the mount; and a spray head coupled to the shaft, wherein the shaft raises and lowers the spray head.

2. The system of claim 1, wherein the mount linearly positions the shaft relative to the arm of the vehicle.

3. The system of claim 1, wherein the mount rotatably positions the shaft relative to the arm of the vehicle.

4. The system of claim 1, wherein the mount is independently adjustable from the arm of the vehicle in at least two directions.

5. The system of claim 1, wherein the shaft is rotatable independent of the mount and rotates the spray head.

6. The system of claim 1, wherein the mount includes at least two legs that stabilize the mount relative to a ground surface.

7. The system of claim 1, wherein the mount includes at least four legs that stabilize the mount relative to a ground surface.

8. A method of cleaning or coating a cavity using the cavity cleaning and coating system of claim 1, the method comprising:

connecting the mount to the arm of the vehicle;

adjusting the mount to position the mount on a ground surface with the shaft substantially vertically oriented above a hole in the ground surface;

lowering the spray head into the hole with the shaft; and raising the spray head out of the hole with the shaft.

9. A cavity cleaning and coating system, comprising:

a mount connectable to an arm of a vehicle by a loading coupler, the arm being capable of raising and lowering the mount, and the mount being independently adjustable relative to the arm of the vehicle;

a shaft housing coupled to the mount;

a shaft movably connected to the shaft housing; and a spray head coupled to the shaft, wherein the shaft raises and lowers the spray head.

10. The system of claim 9, wherein the mount linearly positions the shaft housing relative to the arm of the vehicle.

11. The system of claim 9, wherein the mount rotatably positions the shaft housing relative to the arm of the vehicle.

12. The system of claim 9, wherein the mount is independently adjustable from the arm of the vehicle in at least two directions.

13. The system of claim 9, wherein the shaft is rotatable within the shaft housing independent of the mount and wherein the shaft rotates the spray head.

14. The system of claim 9, wherein the shaft housing includes a plurality of rollers.

15. The system of claim 14, wherein the plurality of rollers guide vertical movement of the shaft within the shaft housing.

16. The system of claim 9, wherein the shaft is raised or lowered with respect to the shaft housing by use of a linear actuator.

17. The system of claim 16, wherein the linear actuator comprises a rack and pinion system.

18. The system of claim 9, further comprising a controller that controls movement of the shaft.

19. The system of claim 1, wherein the mount has a planar back wall and wherein the shaft has an elongate axis that is oriented substantially parallel to a plane defined by the planar back wall of the mount.

20. The system of claim 19, wherein the elongate axis of the shaft is maintained in a substantially parallel orientation to the plane defined by the planar back wall of the mount during raising and lowering of the mount by the arm of the vehicle.

* * * * *